United States Patent
Rybicki et al.

(10) Patent No.: US 7,359,920 B1
(45) Date of Patent: Apr. 15, 2008

(54) COMMUNICATION PROTOCOL FOR SYNCHRONIZATION OF PERSONAL INFORMATION MANAGEMENT DATABASES

(75) Inventors: Stephen G. Rybicki, Boxborough, MA (US); David J. Boothby, Nashua, NH (US); Robert C. Daley, Nashua, NH (US)

(73) Assignee: Intellisync Corporation, San Jose, CA (US)

( * ) Notice: Subject to any disclaimer, the term of this patent is extended or adjusted under 35 U.S.C. 154(b) by 376 days.

(21) Appl. No.: 11/103,258

(22) Filed: Apr. 11, 2005

Related U.S. Application Data

(63) Continuation of application No. 10/124,733, filed on Apr. 16, 2002.

(60) Provisional application No. 60/284,784, filed on Apr. 18, 2001.

(51) Int. Cl.
*G06F 17/00* (2006.01)

(52) U.S. Cl. .................. 707/104.1; 707/101; 707/102; 707/103 R

(58) Field of Classification Search .............. 707/1–10, 707/100–104.1, 200–206
See application file for complete search history.

(56) References Cited

U.S. PATENT DOCUMENTS

| | | |
|---|---|---|
| 4,162,610 A | 7/1979 | Levine |
| 4,432,057 A | 2/1984 | Daniell et al. |
| 4,807,154 A | 2/1989 | Scully et al. |
| 4,807,155 A | 2/1989 | Cree et al. |
| 4,807,182 A | 2/1989 | Queen |
| 4,817,018 A | 3/1989 | Cree et al. |
| 4,819,156 A | 4/1989 | DeLorme et al. |
| 4,819,191 A | 4/1989 | Scully et al. |
| 4,827,423 A | 5/1989 | Beasley et al. |
| 4,831,552 A | 5/1989 | Scully et al. |
| 4,866,611 A | 9/1989 | Cree et al. |
| 4,875,159 A | 10/1989 | Cary et al. |
| 4,939,689 A | 7/1990 | Davis et al. |
| 4,956,809 A | 9/1990 | George et al. |
| 4,980,844 A | 12/1990 | Demjanenko et al. |
| 5,065,360 A | 11/1991 | Kelly |
| 5,124,912 A | 6/1992 | Hotaling et al. |
| 5,134,564 A | 7/1992 | Dunn et al. |
| 5,170,480 A | 12/1992 | Mohan et al. |
| 5,197,000 A | 3/1993 | Vincent |

(Continued)

OTHER PUBLICATIONS

Terry et al., "Managing Update Conflicts in Bayou, a Weakly Connected Replicated Storage System," Proc. Of the Fifteenth ACM Symposium on Operating Systems Principles, pp. 172-182, Dec. 1995, ACM Press.

(Continued)

*Primary Examiner*—Isaac Woo
(74) *Attorney, Agent, or Firm*—Alston & Bird LLP

(57) ABSTRACT

Synchronizing at least first and second instances of PIM databases stored on a client device with at least one instance of a PIM database stored on a server, by running client synchronization software on the client device, running server synchronization software on the server, which is connected to the client device over a communications link, having the client synchronization software determine changes made to the first and second instances on the client device, transmitting the changes in a single transmission, and having the server synchronization software process the changes for both the first and second instances.

18 Claims, 24 Drawing Sheets

---

1. CAP client builds a list of client databases that are enabled for synchronization. If no databases are enabled, this is the end of the synchronization.

2. CAP client authenticates with the server. For HTTP 1.1, this step involves establishing a (secure) connection with the Web Server and authenticating using HTTP-authenticate logic. The result of this authentication step is a token that is attached to each subsequent request in a transport specific manner.

3. CAP client requests unprocessed server changes for the next client database in the synchronization list.

4. CAP client receives server changes and updates its recording of processed server changes. If the server indicates more changes are to follow, the client goes to step 3.

5. CAP client synchronizes the server changes with its own changes using CAAR.

6. CAP client offers any required changes to the server and (optionally) receives acknowledgement of receipt of these changes. The client removes the current database from the synchronization list, and if there is another in the list goes to step 3.

7. Synchronization is complete.

Bi-directional Synchronization with Client CAAR

U.S. PATENT DOCUMENTS

| | | | |
|---|---|---|---|
| 5,201,010 A | 4/1993 | Deaton et al. | |
| 5,204,958 A | 4/1993 | Cheng et al. | |
| 5,210,868 A | 5/1993 | Shimada et al. | |
| 5,220,540 A | 6/1993 | Nishida et al. | |
| 5,228,116 A | 7/1993 | Harris et al. | |
| 5,237,678 A | 8/1993 | Kuechler et al. | |
| 5,251,151 A | 10/1993 | Demjanenko et al. | |
| 5,251,291 A | 10/1993 | Malcolm | |
| 5,261,045 A | 11/1993 | Scully et al. | |
| 5,261,094 A | 11/1993 | Everson et al. | |
| 5,272,628 A | 12/1993 | Koss | |
| 5,276,876 A | 1/1994 | Coleman et al. | |
| 5,283,887 A | 2/1994 | Zachery | |
| 5,293,627 A | 3/1994 | Kato et al. | |
| 5,301,313 A | 4/1994 | Terada et al. | |
| 5,315,709 A | 5/1994 | Alston, Jr. et al. | |
| 5,323,314 A | 6/1994 | Baber et al. | |
| 5,327,555 A | 7/1994 | Anderson | |
| 5,333,252 A | 7/1994 | Brewer, III et al. | |
| 5,333,265 A | 7/1994 | Orimo et al. | |
| 5,333,316 A | 7/1994 | Shampagne et al. | |
| 5,339,392 A | 8/1994 | Risberg et al. | |
| 5,339,434 A | 8/1994 | Rusis | |
| 5,355,476 A | 10/1994 | Fukumura | |
| 5,375,234 A | 12/1994 | Davidson et al. | |
| 5,392,390 A | 2/1995 | Crozier | |
| 5,396,612 A | 3/1995 | Huh et al. | |
| 5,412,801 A | 5/1995 | De Remer et al. | |
| 5,421,012 A | 5/1995 | Khoyi et al. | |
| 5,434,994 A | 7/1995 | Shaheen et al. | |
| 5,444,851 A | 8/1995 | Woest | |
| 5,455,945 A | 10/1995 | Vander Drift | |
| 5,463,735 A | 10/1995 | Pascucci et al. | |
| 5,475,833 A | 12/1995 | Dauerer et al. | |
| 5,511,188 A | 4/1996 | Pascucci et al. | |
| 5,519,606 A | 5/1996 | Frid-Nielsen et al. | |
| 5,530,853 A | 6/1996 | Schell et al. | |
| 5,530,861 A | 6/1996 | Diamant et al. | |
| 5,530,939 A | 6/1996 | Mansfield, Jr et al. | |
| 5,557,518 A | 9/1996 | Rosen | |
| 5,568,402 A | 10/1996 | Gray et al. | |
| 5,581,753 A | 12/1996 | Terry et al. | |
| 5,581,754 A | 12/1996 | Terry et al. | |
| 5,583,793 A | 12/1996 | Gray et al. | |
| 5,600,834 A | 2/1997 | Howard | |
| 5,608,865 A | 3/1997 | Midgely et al. | |
| 5,615,109 A | 3/1997 | Eder | |
| 5,623,540 A | 4/1997 | Morrison et al. | |
| 5,649,182 A | 7/1997 | Reitz | |
| 5,649,195 A | 7/1997 | Scott et al. | |
| 5,659,741 A | 8/1997 | Eberhardt | |
| 5,666,530 A | 9/1997 | Clark et al. | |
| 5,666,553 A | 9/1997 | Crozier | |
| 5,671,407 A | 9/1997 | Demers et al. | |
| 5,682,524 A | 10/1997 | Freund et al. | |
| 5,684,984 A | 11/1997 | Jones et al. | |
| 5,684,990 A | 11/1997 | Boothby | |
| 5,689,706 A | 11/1997 | Rao et al. | |
| 5,701,423 A | 12/1997 | Crozier | |
| 5,704,029 A | 12/1997 | Wright, Jr. | |
| 5,706,452 A | 1/1998 | Ivanov | |
| 5,706,509 A | 1/1998 | Man Hak Tso | |
| 5,710,922 A | 1/1998 | Alley et al. | |
| 5,727,202 A | 3/1998 | Kucala | |
| 5,729,735 A | 3/1998 | Meyering | |
| 5,737,539 A | 4/1998 | Edelson et al. | |
| 5,758,083 A | 5/1998 | Singh et al. | |
| 5,758,150 A | 5/1998 | Bell et al. | |
| 5,758,337 A | 5/1998 | Hammond | |
| 5,758,355 A | 5/1998 | Buchanan | |
| 5,764,918 A | 6/1998 | Poulter | |
| 5,778,388 A | 7/1998 | Kawamura et al. | |
| 5,781,908 A | 7/1998 | Williams et al. | |
| 5,790,974 A | 8/1998 | Tognazzini | |
| 5,799,072 A | 8/1998 | Vulcan et al. | |
| 5,809,494 A | 9/1998 | Nguyen | |
| 5,813,009 A | 9/1998 | Johnson et al. | |
| 5,813,013 A | 9/1998 | Shakib et al. | |
| 5,819,272 A | 10/1998 | Benson | |
| 5,819,274 A | 10/1998 | Jackson, Jr. | |
| 5,832,218 A | 11/1998 | Gibbs et al. | |
| 5,832,489 A | 11/1998 | Kucala | |
| 5,838,923 A | 11/1998 | Lee et al. | |
| 5,845,293 A | 12/1998 | Veghte et al. | |
| 5,857,201 A | 1/1999 | Wright, Jr. et al. | |
| 5,875,242 A | 2/1999 | Glaser et al. | |
| 5,877,760 A | 3/1999 | Onda et al. | |
| 5,878,415 A | 3/1999 | Olds | |
| 5,892,909 A | 4/1999 | Grasso et al. | |
| 5,924,094 A | 7/1999 | Sutter | |
| 5,926,816 A | 7/1999 | Bauer et al. | |
| 5,943,676 A | 8/1999 | Boothby | |
| 5,956,508 A | 9/1999 | Johnson et al. | |
| 5,966,714 A | 10/1999 | Huang et al. | |
| 5,970,502 A | 10/1999 | Salkewicz et al. | |
| 5,978,813 A | 11/1999 | Foltz et al. | |
| 5,995,980 A | 11/1999 | Olson et al. | |
| 5,999,947 A | 12/1999 | Zollinger et al. | |
| 6,006,229 A | 12/1999 | Schmidt et al. | |
| 6,012,063 A | 1/2000 | Bodnar | |
| 6,018,303 A | 1/2000 | Sadeh | |
| 6,081,806 A | 6/2000 | Chang et al. | |
| 6,098,078 A | 8/2000 | Gehani et al. | |
| 6,125,369 A | 9/2000 | Wu et al. | |
| 6,212,221 B1 | 4/2001 | Wakayama et al. | |
| 6,212,529 B1 | 4/2001 | Boothby et al. | |
| 6,216,131 B1 | 4/2001 | Liu et al. | |
| 6,223,187 B1 | 4/2001 | Boothby et al. | |
| 6,233,452 B1 | 5/2001 | Nishino | |
| 6,272,074 B1 | 8/2001 | Winner | |
| 6,275,831 B1 | 8/2001 | Bodnar et al. | |
| 6,295,541 B1 | 9/2001 | Bodnar et al. | |
| 6,304,881 B1 | 10/2001 | Halim et al. | |
| 6,321,236 B1 * | 11/2001 | Zollinger et al. | 707/203 |
| 6,324,542 B1 | 11/2001 | Wright, Jr. et al. | |
| 6,330,568 B1 | 12/2001 | Boothby et al. | |
| 6,341,316 B1 | 1/2002 | Kloba et al. | |
| 6,393,434 B1 | 5/2002 | Huang et al. | |
| 6,404,884 B1 | 6/2002 | Marwell et al. | |
| 6,405,218 B1 | 6/2002 | Boothby | |
| 6,430,576 B1 | 8/2002 | Gates et al. | |
| 6,449,640 B1 * | 9/2002 | Haverstock et al. | 709/219 |
| 6,678,715 B1 | 1/2004 | Ando | |
| 6,711,593 B1 | 3/2004 | Gordon et al. | |
| 2001/0051979 A1 | 12/2001 | Aufricht et al. | |
| 2002/0032722 A1 | 3/2002 | Baynes, Jr. et al. | |
| 2002/0052916 A1 | 5/2002 | Kloba et al. | |
| 2002/0055351 A1 | 5/2002 | Elsey et al. | |
| 2002/0116405 A1 | 8/2002 | Bodnar et al. | |
| 2002/0156798 A1 | 10/2002 | Larue et al. | |
| 2003/0045301 A1 | 3/2003 | Wollrab | |

OTHER PUBLICATIONS

Adly, "HARP: A Hierarchical Asynchronous Replication Protocol for Massively Replicated Systems," Computer Laboratory, Cambridge University, United Kingdom, undated.

Adly et al., "A Hierarchical Asynchronous Replication Protocol for Large Scale Systems," Computer Laboratory, Cambridge University, United Kingdom, Computer Science Department, Alexandria University, Egypt, undated.

Alexander, "Designed, sold, delivered, serviced," Computerworld Client/Server Journal, pp. 43 (Oct. 1, 1995).

Alfieri, "The Best of WordPerfect Version 5.0," Hayden Books, pp. 153-165, 429-435 (1988).
"All I need is a miracle; computer-aided educational packages; Small Wonders," Coastal Associates Publishing L.P. (Mar. 1992).
Alonso et al., "Database System Issues in Nomadic Computing," Matsushita Information Technology Laboratory, New Jersey, undated.
"Automatically Synchronized Objects," Research Disclosure #29261, p. 614 (Aug. 1988).
Badrinath et al., "Impact of Mobility on Distributed Computations," Operating Systems Review (Apr. 1, 1993).
Barbara et al., "Sleeper and Workaholics: Caching Strategies in Mobile Environments (Extended Version)" (Aug. 29, 1994).
Bishop et al., "The Big Picture (Accessing information on remote data management system)", UNIX Review, v. 7, n. 8, p. 38(7), Aug. 1989.
Bowen, M. et al., Achieving Throughput and Functionality in a Common Architecture: The Datacycle Experiement, *IEEE*, pp. 178, 1991.
Brandel, "New offerings fuel revival of PIM," Computerworld, p. 39 (Sep. 12, 1994).
Brodersen, "InfoPad-An Experiment in System Level Design and Integration," (Mar. 1, 1997).
Chapura, Inc., 3 Compare, http://www.chapura.com/3compare.html (1997), pp. 1-2.
Chapura, Inc., PilotMirror Features Page, http://www.chapura.com/features.html (1997), pp. 1-4.
Cobb et al., "Paradox 3.5 Handbook 3rd Edition," Bantam, pp. 803-816 (1991).
Demers et al., "The Bayou Architecture: Support for Data Sharing Among Mobile Users," Computer Science Laboratory, Xerox Palo Alto Research Center, California, undated.
DeVoe et al., "Software: Day-Timer Organizer 2.0 based on format of paper-based PIM," InfoWorld, vol. 17 (Aug. 21, 1995).
FRx Extends Reporting Power of Platinum Series: (IBM Desktop Software's Line of Accounting Software), Doug Dayton, PC Week, v. 8, n. 5, p. 29(2) (Feb. 4, 1991).
Froese, "File System Support for Weekly Connected Operation," pp. 229-238, undated.
Greenberg et al., "Real Time Groupware as a Distributed System: Concurrency Control and its Effect on the Interface," Procs. Of the ACM CSCW Conf. On Computer Supported Cooperative Work, Oct. 22-26, North Carolina, ACM Press (Jan. 1, 1994).
Guy, "Ficus: A Very Large Scale Reliable Distributed File System," Technical Report CSD-910018, Computer Science Dept. UCLA (Technical Report) (Jun. 3, 1991).
Guy et al., "Implementation of the Ficus Replicated File System," appeared in Procs. Of the Summer USENIX Conf., Anaheim, CA, pp. 63-71 (Jun. 1, 1990).
Haber, "Renegade PIMS," Computerworld, p. 109 (Dec. 12, 1994).
Hammer et al., "An Approach to Resolving Semantic Heterogeneity in a Federation of Autonomous, Heterogeneous Database Systems," Computer Science Department, University of Southern California, undated.
Hammer et al., "Object Discovery and Unification in Federated Database Systems," University of Southern California, undated.
HP and IntelliLink connect HP 95LX with HP NewWave; IntelliLink for the HP NewWave; product announcement, HP Professional (Aug. 1991).
"HP announces expanded memory version of palmtop PC, introduces I-Megabyte HP 95LX and 1-Megabyte memory cards," Business Wire, Inc. (Mar. 4, 1992).
Huston et al., "Disconnected Operation of AFS," CITI Technical Report 93-3, Center for Information Technology Integration, University of Michigan (Jun. 18, 1993).
IBM Dictionary of Computing, Tenth Edition, 1993, pp. 268, 269, 31.
IBM Dictionary of Computing, Tenth Edition, 1993, pp. 165, 268, 349, 370, 417.
IEEE Standard Dictionary of Electrical and Electronics Terms, Fourth Edition, 1988, p. 372, 368, 509, 563.
Imielinski, "Mobile Computing—DataMan Project Perspective," Rutgers University, undated.

IntelliLink Brochure (1990).
"IntelliLink 2.2: the software connection from desktop to palmtop; Software Review; IntelliLink 2.2; Evaluation," PC Magazine (Apr. 28, 1992).
"IntelliLink transfers palmtop, PC data; communications software from IntelliLink Inc; brief article; Product Announcement," PC Week; (Nov. 18, 1991).
Jacobs et al., "A Generalized Query-by-Example Data Manipulation Language Based on Database Logic," IEEE Transactions on Software Engineering, vol. SE-9, No. 1 (Jan. 1983).
Jenkins, "Users struggle with E-mail Woes," Computerworld, p. 97 (Oct. 24, 1994).
Johnson et al., "Hierarchical Matrix Timestamps for Scalable Update Propogation," submitted to the $10^{th}$ Int. Workshop on Distributed Algorithms (Jun. 25, 1996).
Joshi et al., "A Survey of Mobile Computing Technologies and Applications," (Oct. 29, 1995).
Kistler et al., "Disconnected Operation in the Code File System," School of Computer Science, Carnegie Melon University, Pennsylvania, undated.
Krill, "Networking: Tech Update," InfoWorld, vol. 18 (Feb. 12, 1996).
Kumar et al., "Log-Based Directory Resolution in the Coda File System," School of Computer Science, Carnegie Melon University, Pennsylvania, undated.
Larson et al., "A Theory of Attribute Equivalence in Databases with Application to Schema Integration," IEEE Transactions on Software Engineering, vol. 15, No. 4, Apr. 1989.
"Logical Connectivity: Applications, Requirements, Architecture, and Research Agenda," Stuart Madnick & Y. Richard Wang, MIT, Systems Sciences, 1991 Hawaii Int'l, vol. 1, IEEE (Jun. 1991).
Lomet, D., Using timestamping to optimize two phase commit; Parallel and Distributed Information Systems, 1993, Proceeding of the Second International Conference, Jan. 20-22, 1993: pp. 48-55.
Mannino et al., "Matching Techniques in Global Schema Design," IEEE 1984.
Marshall, "Product Reviews: Windows contact managers," InfoWorld, vol. 18 (Mar. 25, 1996).
McGoveran, "Distributed not yet delivered," Computerworld, p. 112 (Jun. 6, 1994).
Meckler Corporation, "Palmtop-to-desktop linkage software," Database Searcher (Jun. 1992).
Microsoft Press Computer Dictionary, Second Edition, 1994, p. 164.
Microsoft Press Computer Dictionary, Second Edition, 1994, pp. 105, 217, 227, 228.
Microsoft Press Computer Dictionary, Third Edition, 1997, pp. 194, 228, 234, 449.
Milliken, "Resource Coordination Objects: A State Distribution Mechanism," (DRAFT) (Dec. 10, 1993).
Nash, "Replication falls short," Computer world, p. 65 (Nov. 21, 1994).
Noble et al., "A Research Status Report for Adaptation for Mobile Data Access," School of Computer Science, Carnegie Melon, University, undated.
"Open Network Computing—Technical Overview," Sun Technical Report, Microsystems, Inc., pp. 1-32 (1987).
Organizer Link II Operation Manual, Sharp Electronics Corporation, no date.
"PackRat PIM gets older and wiser with Release 4.0; PIM update sports enhanced interface, greater ease of use," InfoWorld (Dec. 23, 1991).
"Palmtop PCs: power by the ounce; Hardware Review; overview of six evaluations of palm-top computers; includes related articles on Editor's Choices, suitability-to-task ratings, impression by individual users; evaluation," PC Magazine (Jul. 1991).
"Pen-based PCs ready for prime time; includes related article on comparison of operating systems, list of vendors of pen-based products," PC-Computing (Nov. 1991).
Perera, "Synchronization Schizophrenia," Computerworld Client/Server Journal, p. 50 (Oct. 1, 1995).
Petersen et al., "Bayou: Replicated Database Services for Worldwide Applications," Computer Science Laboratory, Xerox Palo Alto Research Center, California, undated.

"Product comparison: Atari Portfolio, Casio Executive BOSS, HP 95LX, Poqet PC, Psion series 3, Sharp Wizard," InfoWorld (Dec. 16, 1991).
"Product Comparison: Personal information managers," InfoWorld, vol. 17 (Aug. 7, 1995).
Que et al., Technical Report entitled "Mobile File Filtering," TR-CS-97-02-Australian National University (Feb. 1, 1997).
Radosevich, "Replication mania," Computerworld Client/Server Journal, p. 53 (Oct. 1, 1995).
Ratner et al., "The Ward Model: A Replication Architecture for Mobile Environments," Department of Computer Science, University of California, undated.
Reiher et al., "Peer-to-Peer Reconciliation Based Replication for Mobile Computers," UCLA, undated.
Reiher et al., "Resolving File Conflicts in the Ficus File System," Department of Computer Science, University of California, undated.
Ricciuti, "Object database server," InfoWorld, vol. 18 (Jan. 29, 1996).
"Riding the NewWave from PC to Palmtop: IntelliLink lets NewWave users transfer files," InfoWorld (Jun. 3, 1991).
Saito, "Consistency Management in Optimistic Replication Algorithms," (Jun. 15, 2001).
Saltor et al., "Suitability of data models as canonical models for federated databases," Universitat Politecnica de Catalunya, Spain, undated.
Satyanarayanan, "Coda: A Highly Available File System for a Distributed Workstation Environment," School of Computer Science, Carnegie Mellon University, undated.
Satyanarayanan, "Fundamental Challenges in Mobile Computing," School of Computer Science, Carnegie Mellon University, undated.
Satanarayanan, "Mobile Information Access," IEEE Personal Communications, vol. 3, No. 1 (Feb. 1996).
Sherman, "Information Technology: 'What Software Should I Use to Organize My Life'," undated.
Sheth et al., "A Tool for Integrating Conceptual Schemas and User Views," IEEE 1988.
Schilit et al., "The ParcTab Mobile Computing System," Xerox Palo Alto Research Center, California, undated.
SPI Database Software Technologies Record Displays: Record 2, Serial No. TDB0291.0094 and Record 4, Serial No. iets0901.0073, undated.
Staten, "PowerMerge 2.0 ships; syncs moved filed," MacWEEK, vol. 8, p. 38(1) (Jan. 3, 1994).
Tait, Doctoral Thesis entitled "A File System for Mobile Computing," (Jan. 1, 1993).
Tolly, "Enhanced Notes 4.0 gets thumbs-up," Computerworld, p. 54 (Dec. 18, 1995).
User Manual for Connectivity Pack for the HP 95LX, Hewlett Packard Company (1991).
User Manual for PC-Link for the B.O.S.S. and the PC-Link for the B.O.S.S., Traveling Software, Inc. (1989).
Webster's Ninth New Collegiate Dictionary, 1986, pp. 114, 436, 440, 462, 573, 597, 620, 717, 906, 963, 979, 989, 1000, 1053, 1130, 1142, 1152, 1162, 1166.
Wiederhold, Gio, Database Design, Second Edition, McGraw-Hill Book Company, 1983, p. 2.
Wiederhold, Gio and Qian Xiaolei, Consistency Control of Replicated Data In Federal Database, IEEE, pp. 130-132. 1990.
Zahn et al., Network Computing Architecture, pp. 1-11; 19-31; 87=115; 117-133; 187-199; 201-209 (1990).
Zaino, "Tapping the Top Values in PDAs—Personal digital assistants that sell for as little as $300 can put a PC in the palm of your hand. Get the scoop on 8 contenders," HomePC, pp. 97 (Oct. 1, 1996).
Zhang et al., "Impact of Workload and System Parameters on Next Generation Cluster Scheduling Mechanisms," IEEE Trans. On Parallel and Distributed Systems, vol. 12, No. 9, (Sep. 2001).
Zisman et al., "Towards Inoperability in Heterogeneous Database Systems," Imperial College Research Report No. DOC 95/11 (Dec. 1, 1995).
IntelliLink for Windows User's Guide, Version 3.0, IntelliLink Corporation (1993).
Database Subsetting Tool: Introduction to DST and DST Designer's Guide, Syware, Inc. (1993).
Sarin, "Robust Application Design in Highly Available Distributed Databases," Proc. 5th Symp. Reliability in Distributed Software and Database Systems, pp. 87-94 (Jan. 13-15, 1986, Los Angeles).
Distributed Management of Replicated Data: Final Report, Computer Corporation of America (Oct. 9, 1984).
Sarin et al., "Overview of SHARD: A System for Highly Available Replicated Data", Computer Corporation of America (Apr. 8, 1988).
SRI Int'l, Network Reconstitution Protocol, RADC-TR-87-38, Final Technical Report (Jun. 1987).
Danberg, "A Database Subsetting Tool" (patent application) (Apr. 12, 1993).
Lamb et al., "The Objectstore Database System," Communications of the ACM, vol. 34, No. 10, pp. 50-63 (Oct. 1991).
TT Interchange, Time Technology, AVG Sales & Marketing Ltd. (1995).
Goldberg et al., "Using Collaborative Filtering to Weave an Information Tapestry," Communications of the ACM, vol. 35, No. 12, pp. 61-70 (Dec. 1992).
Now Up-to-Date Version 2.0 User's Guide, Now Software, Inc. (1992).
An Introduction to DataPropagator Relational Version 1, IBM Corporation (1993).
Data Propagator Relational Guide Release 1, IBM Corporation (May 1994).
DataPropagator Relational Guide Release 2, IBM Corporation (Dec. 1994).
DataPropagator Non Relational MVS/ESA Version 2 Utilities Guide, IBM Corporation (Jul. 1994).
DPROPR Planning and Design Guide, IBM Corporation (Nov. 1996).
DataPropagator Relational Capture and Apply/400 Version 3, IBM Corporation (Jun. 1996).
DataPropagator Relational Capture and Apply for OS/400 Version 3, IBM Corporation (Nov. 1996).
Newton Connection Utilities User's Manual for the Macintosh Operating System, Apple Computer, Inc. (1996).
Newton Connection Utilities User's Manual for Windows, Apple Computer, Inc.
Newton Connection Utilities User's Manual for Macintosh, Apple Computer, Inc.
Newton Backup Utility User's Guide for the Windows Operating System, Apple Computer, Inc. (1995).
Newton Backup Utility User's Guide for the Macintosh Operating System, Apple Computer, Inc. (1995).
Newton Utilities User Manual, Apple Computer, Inc. (1995).
FileMaker Pro Server Administrator's Guide, Claris Corporation (1994).
Connectivity Pack User's Guide for the HP 200LX and the HP 100LX, Hewlett Packard.
Lotus cc:Mail Release 2, Lotus Development Corporation (1991-1993).
User's Guide Lotus Organizer Release 1.0, Lotus Development Corporation (1992).
FileMaker Pro User's Guide, Claris Corporation (1990, 1992).
Poesio et al., "Metric Constraints for Maintaining Appointments: Dates and Repeated Activities".
Slater, "Newton's Legacy; 3COM and Microsoft Battle for Market Share; Apple Newton, 3Com Palm III, Microsoft Palm-size PC personal digital assistants; Product Information", Information Access Company (1998).
Negrino, "ACT 2.5.1, ACT for Newton 1.0", UMI, Inc. (1996).
Zilber, "Toy story; personal digital assistants; Product Information", Information Access Company (1996).
Wingfield, "Desktop to Newton connectivity", UMI, Inc. (1996).
"Now Software Announces Updated Synchronization Software for Newton 2.0 Devices; Now Synchronize Simultaneously Updates MessagePad, Now Up-to-Date & Contact", Business Wire, Inc. (1995).
"Claris Ships FileMaker Pro 3.0 for Macintosh and Windows"; Business Wire, Inc. (1995).

Alsop, "Distributed Thinking; Realizing the gravity of its PDA problems, Apple has drawn me back to Newton", InfoWorld Media Group (1995).

Rubin, "Now Software stays in sync; Now Synchronize file synchronization software for Macs and Newton PDAs; Software Review; EvaluationBrief Article", Information Access Company (1995).

"Now Calendar/Scheduler/Contact Mgr for Mac Update", Post-Newsweek Business Information Inc. (1995).

Staten, "csInStep middleware lets Newton talk to PIMs; Concierge Software LC's csInStep; Brief Article; Product Announcement; Brief Article", Information Access Company (1995).

Baum, "Designing Mobile applications; A new approach needed for on-the-road systems", InfoWorld Media Group (1994).

Parkinson, "Remote users get in sync with office files; News Analysis", Information Access Company (1994).

Informix Guide to SQL Tutorial Version 7.1, Dec. 1994.

Oracle 7 Distributed Database Technology and Symmetric Replication, Oracle White Paper, Apr. 1995.

Oracle 7 Server Distributed Systems, vol. II: Replicated Data, Release 7.3, Feb. 1996.

Oracle 7™ Server SQL Manual Release 7.3, Feb. 1996.

Quaglia, F. et al., Grain Sensitive Event Scheduling in Time Warp Parallel Discrete Event Simulation, Fourteenth Workshop on Parallel Distributed Simulation, PADS 2000, May 28-31, 2000: pp. 173-180.

Salzberg, B., Timestamping After Commit, Procs. Of the Third Int. Conf. On Parallel and Distributed Information Systems, Sep. 28-30, 1994: pp. 160-167.

Zhang et al., Impact of Workload and System Parameters on Next Generation Cluster Scheduling Mechanisms, IEEE Trans. On Parallel and Distributed Systems, vol. 12, No. 9, Sep. 2001: pp. 967-985.

\* cited by examiner

| |
|---|
| 1. CAP client builds a list of client databases that are enabled for synchronization. If no databases are enabled, this is the end of the synchronization. |
| 2. CAP client authenticates with the server. For HTTP 1.1, this step involves establishing a (secure) connection with the Web Server and authenticating using HTTP-authenticate logic. The result of this authentication step is a token that is attached to each subsequent request in a transport specific manner. |
| 3. CAP client requests unprocessed server changes for the next client database in the synchronization list. |
| 4. CAP client receives server changes and updates its recording of processed server changes. If the server indicates more changes are to follow, the client goes to step 3. |
| 5. CAP client synchronizes the server changes with its own changes using CAAR. |
| 6. CAP client offers any required changes to the server and (optionally) receives acknowledgement of receipt of these changes. The client removes the current database from the synchronization list, and if there is another in the list goes to step 3. |
| 7. Synchronization is complete. |

Bi-directional Synchronization with Client CAAR

FIG. 1

1. CAP client builds a list of client databases that are enabled for synchronization. If no databases are enabled, this is the end of the synchronization.

2. CAP client authenticates with the server. For HTTP 1.1, this step involves establishing a (secure) connection with the Web Server and authenticating using HTTP-authenticate logic. The result of this authentication step is a token that is attached to each subsequent request in a transport specific manner.

3. CAP client offers any changes for the next client database in the synchronization list to the server. This offer specifies that the server will be performing CAAR. The client (optionally) receives acknowledgement of receipt of these changes.

4. CAP client keeps requesting all unprocessed server changes and updates its recording of processed server changes until the server has no more changes to return to the CAP client.

5. Client removes the current database from the synchronization list, and if there is another in the list repeats step 3.

6. Synchronization is complete.

Bi-directional Synchronization with Server CAAR

FIG. 2

| |
|---|
| 1. CAP client builds a list of client databases that are enabled for synchronization. If no databases are enabled, this is the end of the synchronization. |
| 2. CAP client authenticates with the server. For HTTP 1.1, this step involves establishing a (secure) connection with the Web Server and authenticating using HTTP-authenticate logic. The result of this authentication step is a token that is attached to each subsequent request in a transport specific manner. |
| 3. CAP client requests unprocessed server changes for the next client database in the synchronization list. |
| 4. CAP client receives server changes and updates its recording of processed server changes. If the server indicates more changes are to follow, the client goes to step 3. |
| 5. CAP client synchronizes the server changes with its own changes using CAAR. |
| 6. Client removes the current database from the synchronization list, and if there is another in the list goes to step 3. |
| 7. Synchronization is complete. |

Unidirectional Synchronization with Client CAAR

FIG. 3

| |
|---|
| 1. CAP client builds a list of client databases that are enabled for synchronization. If no databases are enabled, this is the end of the synchronization. |
| 2. CAP client authenticates with the server. For HTTP 1.1, this step involves establishing a (secure) connection with the Web Server and authenticating using HTTP-authenticate logic. The result of this authentication step is a token that is attached to each subsequent request in a transport specific manner. |
| 3. CAP client offers any changes for the next client database in the synchronization list to the server. This offer specifies that the server will be performing CAAR. The client (optionally) receives acknowledgement of receipt of these changes. |
| 4. Client removes the current database from the synchronization list, and if there is another in the list repeats step 3. |
| 5. Synchronization is complete. |

Unidirectional Synchronization with Server CAAR

FIG. 4

| |
|---|
| 1. CAP client clears all indications that data has changed in the database to have duplicates eliminated. This can amount to clearing record dirty bits if this is how the database / OS indicate record changes or by clearing a record change log for the database. |
| 2. CAP client resets the server-bound queue for the database to be empty. The CAP client sets the highest client-consumed SACN to ZERO. |
| 3. CAP client sets the highest client-consumed SACN to ZERO. |
| 4. CAP client sets the last CACN assigned to ZERO. |
| 5. CAP client resets the client-side ID mapping table (if any) to be empty. |
| 6. CAP client finds all existing records in the database; for each record, assign a CACN, (First one found gets CACN=1, second one gets CACN=2, etc. The order is arbitrary.) and add an element to the server-bound queue. Element consists of CACN, CAID, and opcode=ADD. If this client is designed to use a client-side ID mapping table, add a (CAID,AAID) entry to the mapping table, where CAID=AAID. |
| 7. If the local record count is ZERO, set persistent First-Time-Sync flag, to affect the next sync, then return SUCCESS. No need to send Duplicate Elimination request to server. |
| 8. CAP client authenticates with the server. For HTTP 1.1, this step involves establishing a (secure) connection with the Web Server and authenticating using Http-authenticate logic. The result of this authentication step is some token which is attached to each subsequent request in a transport specific manner. |
| 9. CAP client composes and sends a Duplicate Elimination request to the server. For each local ADD the DE request contains a hash, computed by the client, and a CAID. See Appendix A for details on the computation of this hash). |
| 10. CAP client receives a DE response that contains a list of CAIDs that either should or should not be sent to the server on the next synchronization. If the list of CAIDs is the list not to be sent, each one of the records in the list is removed from the outbound server queue; these records will not be sent down to the server on the next synchronization. If the list is a list of CAIDs to be sent, all other CAIDs in the outbound server queue are removed. |

Duplicate Elimination

FIG. 5

| Operation Name | Operation Id | Description | Response? |
|---|---|---|---|
| Return Status | 0x00 | Return status for a previous operation | No |
| Add | 0x01 | Add/Create a record | Only for Status |
| Delete | 0x02 | Delete a record | Only for Status |
| Delete All | 0x03 | Delete all records | Only for Status |
| Modify | 0x04 | Modify an existing record | Only for Status |
| Cancel Procedure | 0x08 | Cancel a currently pending procedure | No |
| Advertise Properties | 0x0A | Advertise operational properties | No |
| Get Server Deltas | 0x30 | Get server deltas for specified database since last processed SACN | In Return Status |
| Offer Client Deltas | 0x31 | Offer client deltas since last processed CACN | In Return Status |
| Get Server State | 0x32 | Get last processed CACN | In Return Status |
| Duplicate Elimination | 0x33 | Get list of record IDs that are duplicated on client and server | In Return Status |
| Configure | 0x34 | Get/Set configuration options for a user | In Return Status |

Command and Data Operations

FIG. 6

| Status | Value | Meaning |
|---|---|---|
| Success | 0x00 | OK – Success |
| Bad Operation | 0x01 | Operation contains malformed syntax |
| Unauthorized Operation | 0x02 | Operation needs authentication |
| Conflict | 0x03 | Database may be locked |
| Unsupported Operation | 0x04 | Operation Not Supported |
| Unknown Target | 0x05 | Operation specified unknown target |
| Operation Refused | 0x06 | Operation was refused by user |
| Recipient Busy | 0x07 | Operation could not be processed, recipient was busy |

Supported Values for Operation Status Term of Return Status Operation

FIG. 7

| Operation-Id | Operation-data | Description |
|---|---|---|
| Add (0x01) | original-unique-id [assigned-unique-id CACN] | Original and optional newly assigned Unique record ID of Add, and CACN (when client is sending Return Status) |
| Delete (0x02) | unique-id | Unique record ID of Delete |
| Delete All (0x03) | None | None |
| Modify (0x04) | unique-id | Unique record ID of Modify |
| Cancel Procedure (0x08) | None | None |
| Get Server Deltas (0x30) | client-instance-id db-id CACN [more-data-flag] | See below |
| Offer Client Deltas (0x31) | client-instance-id db-id CACN [more-status-flag] | See below |
| Get Server State (0x32) | client-instance-id db-id CACN | CACN for the last processed client delta |
| Duplicate Elimination (0x33) | client-instance-id db-id [dup-flag CAID-list] | List of CAIDs that should (or should not) be sent to server |
| Configure (0x34) | Varies | See the Configure operation for details |

Interpretation of Operation-id and Operation-data term of the Return Status Operation

FIG. 8

| Property Name | Property-Id | Value | Description |
|---|---|---|---|
| Version | 0x00 | 2 BYTEs | Supported version of CAP |
| Cleanse Field Parameters | 0x01 | (see below) | Specify parameters for a Cleanse Field Rule on the Server |

Supported Values for the property-id term of the Advertise Properties Operation

FIG. 9

| Rule Name | Cf-rule-id | Description | Cfp-data Value(s) |
|---|---|---|---|
| Category List | 0x00 | Specify a list of categories for the data section | A string containing list of categories for the data section separated by a ";" |

Cleanse Rule Identifiers and Values for the cfp-data term of the Advertise Properties Operation

FIG. 10

| |
|---|
| 1. Create the field list for the record. |
| 2. For each record in the data section:<br>   a. Normalize the fields in the field list for each record.<br>   b. Compute hash on the fields in the field list for each record. |

Hash Computation for Duplicate Elimination

FIG. 11

| Cfg-subcommand | Opcode | Description |
| --- | --- | --- |
| Assign Client Instance ID | 0x00 | Requests a client-instance-id from the server |
| Remove Client Instance ID | 0x01 | Removes a client-instance-id from the server |

Subcommands available in Configure Operation

FIG. 12

| Client-id | Value(s) | Description |
|---|---|---|
| Palm OS | "PalmOS" | PalmOS devices (including Palm III/V/VII, IBM WorkPad, Handspring) |
| Windows CE | "WinCE" | Windows CE devices |
| Symbian | "Symbian" | Symbian EPOC devices |
| RIM Pager | "RIM" | Research in Motion Pager devices |

Client-id values for Assign Client Instance ID Subcommand

FIG. 13

| Configure Subcommand | Subcommand-data | Description |
|---|---|---|
| Assign Client Instance ID (0x00) | client-instance-id [user-id] | Newly assigned client instance ID |
| Remove Client Instance ID (0x01) | None | None |

Contents of subcommand-data term for the Return Status operation for the configure operation

FIG. 14

| |
|---|
| 1. CAP client connects to and authenticates with the server. Note that this is accomplished using HTTP 1.1 authentication and no CAP messages are involved. |
| 2. CAP client computes and offers its status from the last synchronization and changes since the last synchronization with the server. |
| 3. CAP client requests the server to send its changes since the requested change number. |
| 4. CAP client disconnects with the server. Note that this is a TCP/IP disconnect and does not involve any CAP messages. |

Steps for Bi-directional synchronization with Server CAAR

FIG. 15

| CAP Message Element | Bytes | Sample Data |
|---|---|---|
| Offer Client Deltas opcode | 1 | 0x31 |
| Offer Client Deltas data length | 4 | 8 |
| Offer Client Deltas client-instance-id length | 1 | 1 |
| Offer Client Deltas client-instance-id data | 1 | 3 |
| Offer Client Deltas db-id length | 1 | 1 |
| Offer Client Deltas db-id data | 1 | 0x01 (Address Book) |
| Offer Client Deltas SACN | 4 | 0x00004567 |
| Return Status opcode | 1 | 0x00 |
| Return Status data length | 4 | 16 |
| Return Status status code | 1 | 0 (Success) |
| Return Status operation id | 1 | 0x01 (Add) |
| Return Status Add original-unique-id length | 1 | 4 |
| Return Status Add original-unique-id data | 4 | 0x12540032 (SAID of the added record) |
| Return Status Add assigned-unique-id length | 1 | 4 |
| Return Status Add assigned-unique-id data | 4 | 0x0F00D033 (CAID of the added record) |
| Return Status Add CACN | 4 | 0x0001024 (CACN of the identifier assignment) |
| Add opcode | 1 | 0x01 |
| Add data length | 4 | 63 |
| Add CACN | 4 | 0x00001025 (CACN of the Add operation) |
| Add unique-id length | 1 | 4 |
| Add unique-id data | 4 | 0x0F00D010 |
| Add record-data | 54 | "BEGIN:VCARD\nFN:Joe Smith\nTEL:+1-800-555-1234\nEND:VCARD" |
| Delete opcode | 1 | 0x02 |
| Delete data length | 4 | 9 |
| Add CACN | 4 | 0x00001026 (CACN of the Delete operation) |
| Delete unique-id length | 1 | 4 |
| Delete unique-id | 4 | 0x0F00D211 |
| | | |
| Return Status opcode | 1 | 0x00 |
| Return Status data length | 4 | 10 |

FIG. 16A

| Return Status status code | 1 | 0 (Success) |
|---|---|---|
| Return Status operation id | 1 | 0x31 (Offer Client Deltas) |
| Return Status Offer Client Deltas client-instance-id length | 1 | 1 |
| Return Status Offer Client Deltas client-instance-id data | 1 | 3 |
| Return Status Offer Client Deltas db-id length | 1 | 1 |
| Return Status Offer Client Deltas db-id data | 1 | 0x01 (Address Book) |
| Return Status Offer Client Deltas Last Consumed CACN | 4 | 0x00001026 (i.e. all offered CACNs were consumed successfully by the server) |
| | | |
| Get Server Deltas opcode | 1 | 0x30 |
| Get Server Deltas data length | 4 | 8 |
| Get Server Deltas client-instance-id length | 1 | 1 |
| Get Server Deltas client-instance-id data | 1 | 3 |
| Get Server Deltas db-id length | 1 | 1 |
| Get Server Deltas db-id data | 1 | 0x01 (Address Book) |
| Get Server Deltas SACN | 4 | 0x00004567 |
| | | |
| Return Status opcode | 1 | 0x00 |
| Return Status data length | 4 | 11 |
| Return Status status code | 1 | 0 (Success) |
| Return Status operation id | 1 | 0x30 (Get Server Deltas) |
| Return Status Get Server Deltas client-instance-id length | 1 | 1 |
| Return Status Get Server Deltas client-instance-id data | 1 | 3 |
| Return Status Get Server Deltas db-id length | 1 | 1 |
| Return Status Get Server Deltas db-id data | 1 | 0x01 (Address Book) |
| Return Status Get Server Deltas Last Consumed CACN | 4 | 0x00001026 |
| Return Status Get Server Deltas More Data flag | 1 | 0 |
| Modify opcode | 1 | 0x04 |

FIG. 16B

| Modify data length | 4 | 50 |
| --- | --- | --- |
| Modify SACN | 4 | 0x00004580 (SACN for Modify) |
| Modify unique-id length | 1 | 4 |
| Modify unique-id data | 4 | 0x0F00D018 |
| Modify record-data | 41 | "BEGIN:VCARD\nTEL:+1-907-555-9897\nEND:VCARD" |
| Add opcode | 1 | 0x01 |
| Add data length | 4 | 103 |
| Add SACN | 4 | 0x00004582 (SACN for Add) |
| Add unique-id length | 1 | 4 |
| Add unique-id data | 4 | 0x12540345 |
| Add record-data | 94 | "BEGIN:VCARD\nFN:John Public\nEMAIL\;TYPE=INTERNET:jpublic@mymail.net\nTEL:+1-444-555-2872\nEND:VCARD" |

CAP Messages for Bi-directional synchronization with Server CAAR

FIG. 16C

| |
|---|
| 1. CAP client connects to and authenticates with the server. Note that this is accomplished using HTTP 1.1 authentication and no CAP messages are involved. |
| 2. CAP client computes CAH hashes for all records in the both data sections. |
| 3. CAP client prepares and sends a Duplicate Elimination request to the server. |
| 4. CAP client receives a response from the server that contains a list of the CAIDs that are duplicated on the server. |
| 5. CAP client can remove the records corresponding to these CAIDs from its offer list. |
| 6. CAP client disconnects with the server. Note that this is a TCP/IP disconnect and does not involve any CAP messages. Also note that if the Duplicate Elimination procedure is being performed as a precursor to a first time or re-synchronization, the client can perform this synchronization operation before it disconnects from the server. |

Steps for Duplicate Elimination

FIG. 17

| CAP Message Element | Bytes | Sample Data |
|---|---|---|
| Duplicate Elimination opcode | 1 | 0x33 |
| Duplicate Elimination data length | 4 | 29 |
| Duplicate Elimination client-instance-id length | 1 | 1 |
| Duplicate Elimination client-instance-id data | 1 | 3 |
| Duplicate Elimination db-id length | 1 | 1 |
| Duplicate Elimination db-id data | 1 | 0x01 (Address Book) |
| Duplicate Elimination record-count | 4 | 3 |
| Duplicate Elimination CAID length for 1st record | 1 | 4 |
| Duplicate Elimination CAID data for 1st record | 4 | 0x0F00D033 |
| Duplicate Elimination CAH for 1st record | 2 | 0x1CC2 |
| Duplicate Elimination CAID length for 2nd record | 1 | 4 |
| Duplicate Elimination CAID data for 2nd record | 4 | 0x0F00D011 |
| Duplicate Elimination CAH for 2nd record | 2 | 0x9987 |
| Duplicate Elimination CAID length for 3rd record | 1 | 4 |
| Duplicate Elimination CAID data for 3rd record | 4 | 0x0F00D101 |
| Duplicate Elimination CAH for 3rd record | 2 | 0x84DA |
|  |  |  |
| *Return Status opcode* | *1* | *0x00* |
| *Return Status data length* | *4* | *16* |
| *Return Status status code* | *1* | *0 (Success)* |
| *Return Status operation id* | *1* | *0x33 (Duplicate Elimination)* |
| *Return Status Duplicate Elimination client-instance-id length* | *1* | *1* |
| *Return Status Duplicate Elimination client-instance-id data* | *1* | *3* |

FIG. 18A

| Return Status Duplicate Elimination db-id length | 1 | 1 |
| --- | --- | --- |
| Return Status Duplicate Elimination db-id data | 1 | 0x01 (Address Book) |
| Return Status Duplicate Elimination dup-flag | 1 | 1 |
| Return Status Duplicate Elimination CAID list length | 4 | 1 |
| Return Status Duplicate Elimination CAID length for duplicated record #1 | 1 | 4 |
| Return Status Duplicate Elimination CAID for duplicated record #1 | 4 | 0x0F00D101 |

CAP Messages for Duplicate Elimination

FIG. 18B

1. CAP client connects to and authenticates with the server. Note that this is accomplished using HTTP 1.1 authentication and no CAP messages are involved.

2. CAP client sends an Assign Client Instance ID Request to the server.

3. CAP client receives a response from the server.

4. CAP client disconnects with the server. Note that this is a TCP/IP disconnect and does not involve any CAP messages. Also note that generally the Assign Client Instance ID procedure is being performed as a precursor to a first time synchronization with the server from a newly installed CAP client. The client can perform this synchronization operation (including a duplicate elimination operation) before it disconnects from the server.

Steps for Client Instance Identifier Assignment

FIG. 19

| CAP Message Element | Bytes | Sample Data |
|---|---|---|
| Configure opcode | 1 | 0x34 |
| Configure data length | 4 | 22 |
| Configure subcommand | 1 | 0x00 (Assign Client Instance ID) |
| Configure Assign Client Instance ID client-id | 7 | "PalmOS" (7 bytes includes null term for string) |
| Configure Assign Client Instance ID client-name | 14 | "Jake's Palm V" (14 bytes includes null term for string) |
| | | |
| Return Status opcode | 1 | 0x00 |
| Return Status data length | 4 | 4 |
| Return Status status code | 1 | 0 (Success) |
| Return Status operation id | 1 | 0x34 (Configure) |
| Return Status Configure client-instance-id length | 1 | 1 |
| Return Status Configure client-instance-id data | 1 | 0x03 |

CAP Message for Client Instance Identifier Assignment

FIG. 20

COMMUNICATION PROTOCOL FOR SYNCHRONIZATION OF PERSONAL INFORMATION MANAGEMENT DATABASES

CROSS-REFERENCE TO RELATED APPLICATIONS

This application is a continuation application of and claims priority to U.S. application Ser. No. 10/124,733, filed on Apr. 16, 2002, which claims priority from U.S. Provisional Application Ser. No. 60/284,784, filed Apr. 18, 2001.

TECHNICAL FIELD

This invention relates to synchronization of databases, and more particularly to synchronization of personal information management (PIM) databases.

BACKGROUND

Personal information management (PIM) databases have seen increasing use over the last several years. Different instances of such PIM databases, which typically include e-mail, calendar, address, telephone, and notes, are often stored on different devices, e.g., on a handheld computer (e.g., a Palm OS, Windows CE, or RIM device) and a desktop computer (e.g., running Outlook or Lotus Notes). Keeping the different instances of the PIM databases consistent is typically done using synchronization software, e.g., Intellisync software sold by Pumatech, Inc., of San Jose, Calif., the assignee of this application. Typically, the synchronization software is resident on one of the two devices—most commonly on the desktop, as it has the greater memory and processing capability. Synchronization is performed by connecting the two devices across a communication link (e.g., a serial connection), and then initiating the synchronization software. Typically, full database records are transferred between the two devices, e.g., from the handheld to the desktop.

It is now becoming common to find more than two instances of the same PIM database. For example, in addition to having those just described for a handheld and desktop computer, an individual may also have a PIM database on a cellular telephone (e.g., a built-in telephone and calendar database), a notebook computer running desktop PIM software (e.g., Outlook or Lotus Notes), and a web-based PIM such as Yahoo Calendar. Keeping all of these different instances of a PIM database synchronized is typically done using a client-server approach, in which each of the different instances is a client of a synchronization server, which is typically accessed over the Internet (e.g., Intellisync.com).

SUMMARY

In general, the invention features a method for synchronizing a client instance of a PIM database stored on a client device with a server instance of a PIM database stored on a server, the method comprising running client synchronization software on the client device, running server synchronization software on the server, which is connected to the client device over a communications link, having the client synchronization software process at least some records of the client instance of the PIM database to form hashes of the records, transmitting the hashes from the client device to the server, having the server synchronization software determine from the hashes whether the at least some records of the client instance are present in the server instance, having the server transmit to the client an indication of which of the at least some records are present in the server instance, and having the client refrain from transmitting the records for which an indication is received that the records are present in the server instance.

In preferred implementations, one or more of the following features may be incorporated. The PIM database may comprise different sections, including at least two of the following: calendar, address, and e-mail sections. At least some records that are processed by the client to form hashes may comprise substantially all of the records of at least one of the sections. The invention may further comprise having the client send a unique record identifier along with the hash for each of the at least some records. The indication transmitted to the client by the server may comprise a list of record identifiers indicating to the client either the records that are found on the server or the records that are missing on the server.

In another aspect, the invention features one or more computer programs, resident on one or more computer readable media, for synchronizing a client instance of a PIM database stored on a client device with a server instance of a PIM database stored on a server, the computer programs comprising instructions for running client synchronization software on the client device, running server synchronization software on the server, which is connected to the client device over a communications link, having the client synchronization software process at least some records of the client instance of the PIM database to form hashes of the records, transmitting the hashes from the client device to the server, having the server synchronization software determine from the hashes whether the at least some records of the client instance are present in the server instance, having the server transmit to the client an indication of which of the at least some records are present in the server instance, and having the client refrain from transmitting the records for which an indication is received that the records are present in the server instance.

In preferred implementations, one or more of the following features may be incorporated. The PIM database may comprises different sections, including at least two of the following: calendar, address, and e-mail sections. At least some records that are processed by the client to form hashes may comprise substantially all of the records of at least one of the sections. The invention may further comprise having the client send a unique record identifier along with the hash for each of the at least some records. The indication transmitted to the client by the server may comprise a list of record identifiers indicating to the client either the records that are found on the server or the records that are missing on the server.

The various aspects and embodiments of the invention generally have one or more of the following advantages: They reduce the chattiness of transmissions required for synchronization, and thus are better suited for wireless communications than many prior art techniques. They can be used with different network protocols (e.g., HTTP, OBEX, WSP/B), and with different data formats.

The details of one or more embodiments of the invention are set forth in the accompanying drawings and the description below. Other features and advantages of the invention will be apparent from the description and drawings, and from the claims.

DESCRIPTION OF DRAWINGS

FIG. 1 is a flow chart showing bi-directional synchronization with client CAAR.

FIG. 2 is a flow chart showing bi-directional synchronization with server CAAR.

FIG. 3 is a flow chart showing unidirectional synchronization with client CAAR.

FIG. 4 is a flow chart showing unidirectional synchronization with server CAAR.

FIG. 5 is a flow chart showing the steps in the duplicate elimination procedure.

FIG. 6 is a list of the data and command operations.

FIG. 7 is a list of the supported values for the operation-status term.

FIG. 8 shows the structure of the operation-id and corresponding operation-data term.

FIG. 9 lists the supported values for the property-id term of the Advertise Properties operation.

FIG. 10 gives the cleanse field rule identifiers and values for the cfp-data term of the Advertise Properties operation.

FIG. 11 shows hash computation for duplicate elimination.

FIG. 12 shows available configuration subcommands.

FIG. 13 shows client-id values for mobile devices.

FIG. 14 shows the contents of the subcommand-data term for the return status operation for the configure operation.

FIG. 15 is a flow chart showing the steps for bi-directional synchronization with server CAAR.

FIG. 16 shows CAP messages for bi-directional synchronization with server CAAR.

FIG. 17 is a flow chart showing steps for duplicate elimination.

FIG. 18 shows CAP messages for duplicate elimination.

FIG. 19 is a flow chart showing the steps for client instance identifier assignment.

FIG. 20 shows CAP messages for client instance identifier assignment.

DETAILED DESCRIPTION

Figure 21:
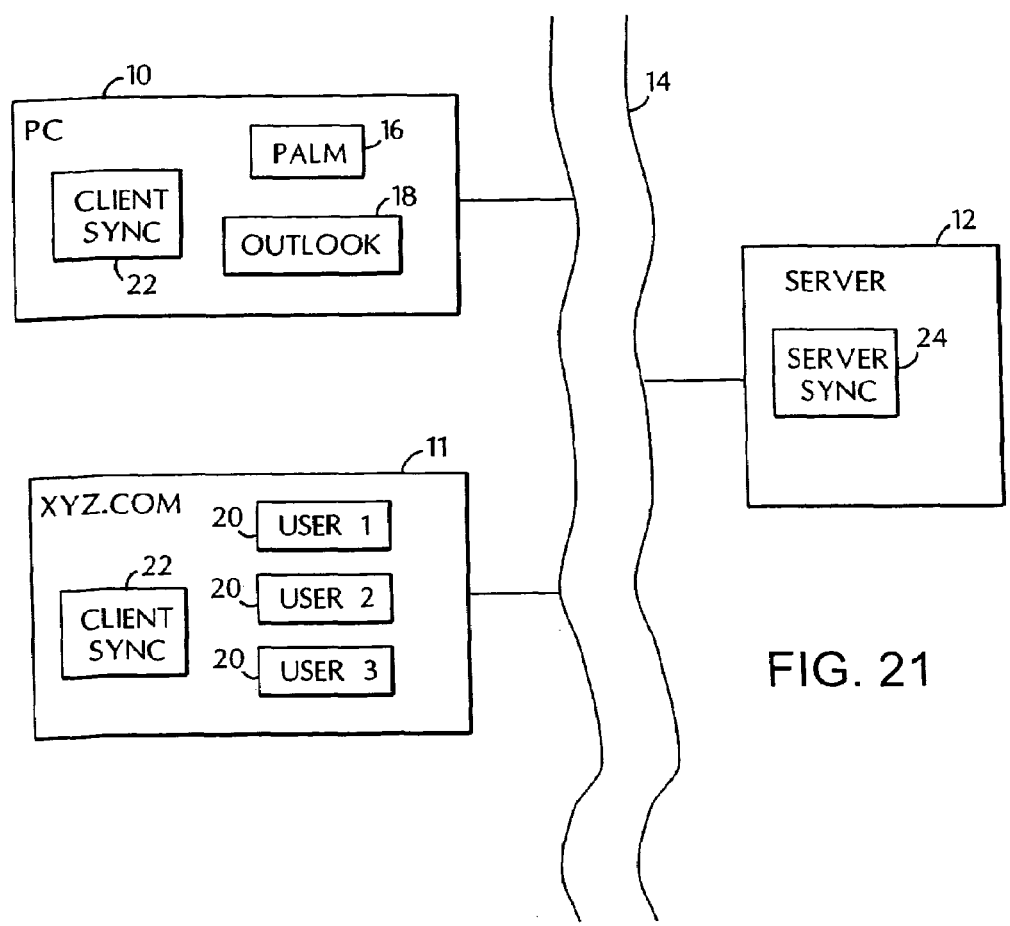
FIG. 21 is a block diagram showing the general arrangement of computing devices with which the CAP Protocol can be used.

What follows is a detailed description of one of many possible specific embodiments of the invention. It should be understood that the invention encompasses a much broader range of implementations than what is described here for one particular embodiment. The embodiment described here is the Client Access Protocol (CAP) developed by Pumatech, Inc., the assignee of the present application.

FIG. 21 is a block diagram showing the general arrangement of client devices 10, 11, server 12, and communication link 14, in which CAP is used. Each client device has one or more instances of a PIM database. Some clients, e.g., a desktop PC client 10, may have a plurality of instances of the same PIM database; a Palm desktop instance 16 and an Outlook instance 18 are shown in the figure. Other clients, e.g., handheld devices (not shown) may have only a single instance. A Web-based PIM client 11 (which may comprise many interconnected computers of, e.g., an application server) may store the PIM databases 20 of a multiplicity of users. Within each instance of a PIM database there may be a plurality of sections, e.g., calendar, address, and e-mail sections. Client synchronization software 22 (generally customized for the type of client device) resides on each client device. Server synchronization software 24 resides on the server. The communication link 14 may comprise the Internet. The client synchronization software and server synchronization software use CAP for communications between the client and server.

CAP is a lightweight, request/response protocol for accomplishing client to server communication for synchronizing PIM databases and performing related functions. CAP can be bound to any request/response based transport protocol, e.g., HTTP, OBEX, and WSP/B. The protocol described in this specific example is HTTP 1.1. The content of CAP requests and responses is opaque to the transport protocol. CAP is used to send requests from a client to an associated server and to receive responses to those requests.

A CAP message consists of a CAP command operation optionally followed by a concatenated list of CAP data operations. CAP command operations define the scope of all CAP data operations that follow in a CAP message until either the next CAP command operation or the end of the message. This means that it is possible to change the scope of all CAP data operations that follow in a message by concatenating another CAP command operation after the last CAP data operation regardless of the scope defined by the first CAP command operation in the message. This feature enables multiple data section synchronization requests in a single CAP message. Another example of a CAP command operation is an operation that allows the CAP client to query the server to provide the client with a set of operations that describe the changes to the server database since the last time this client contacted the server. These CAP command operations are only sent from the CAP client.

CAP command operations define the instance of a PIM database and the section with that PIM database to which following data operations relate. A data section is the type of PIM database (e.g. e-mail, address book). CAP data operations accomplish the actual changes to the data in a data section. Anytime data is added, modified, or deleted in a database during synchronization, it occurs because of a CAP data operation. Data sections can be enabled or disabled for synchronization. Any data sections that are disabled for synchronization on a CAP client will not be synchronized with the server.

CAP uses transport protocol specific features to implement encryption. For HTTP 1.1, SSL encryption is used (and its IETF equivalent, TLS). CAP also uses transport protocol features to implement client authentication. For HTTP 1.1, HTTP-Authenticate logic is used.

Client Identifiers and Client Instance Identifiers

There are two basic types of clients for which CAP is useful: application clients and device clients. An application client stores and manages database data for more than one user; an example is an Internet site that provides mobile device synchronization with the data its users store on its site. A device client stores and manages database data for a single user. Examples of device clients are mobile devices like Palm OS and Windows CE devices, and personal computers (PCs).

Clients have a client identifier assigned to them when they initially register with the service operating the server. This is used to store class information about the client that is used to synchronize users for that client (e.g. the descriptions of the data section types for the client). Users for a particular class of client are called client instances of that client. Client instances also have identifiers assigned for them by the server (see below). A client instance identifier identifies a particular user/client binding and represents a data source to be synchronized by the server.

Unique Record Identifiers

One requirement that CAP imposes on its clients and servers is that some entity that interacts with a data section must provide an identifier for each record that is unique for the life of the data section. Records are assigned unique identifiers when they are added to a database. There are several types of unique identifiers.

Application assigned identifier (AAID): These identifiers are assigned by client applications that are synchronized by a CAP client. These identifiers are not transmitted outside of the CAP client and are only for local use on the CAP client. AAIDs are not sent in CAP operations and can be any size.

Client assigned identifier (CAID): These are assigned by the CAP client and are used to communicate the identifier associated with a record in the CAP client database to the server. CAIDs should be as small as possible while still meeting the requirements for unique identifiers in order to reduce CAP message size. CAIDs for a single data section must be the same size for all records. The CAP client can choose to use the AAID assigned by the CAP client application as the CAID for an application database record (if it meets the criteria for a CAID). The CAP client can also choose to associate the AAID with a CAID assigned by the CAP client and maintain a mapping table between the two identifiers.

Server assigned identifier (SAID). The server assigns these identifiers to records in the database.

One of the cornerstones of synchronizing two databases with unique identifiers for all records is to maintain a mapping between the unique identifier for a record in one database and that same record in another database. When synchronizing two databases residing on two different systems, one or both of the systems maintains this mapping. Preferably, the server always maintains this identifier mapping. Therefore CAP clients need to be able to do one of the following.

1. Accept server unique identifiers for records on which they operate (i.e. operate on SAIDs). In this case, the CAP client maintains an identifier mapping table between the SAID and the AAID. The SAID is used as the CAID for operations on records that are sent to the server.

2. Send back the CAID for the SAID in a Return Status operation when the server adds a record to the CAP client to allow the server to know the unique identifier that it should use when referring to that record.

Option 1 requires the CAP client to send smaller Return Status operations from the CAP client to the server to process an Add operation from the server, but it requires that the CAP client maintain a mapping table. Option 2 relieves the CAP client from the responsibility of maintaining a mapping table, but requires larger Return Status operations for the Add operations. The client is responsible for making the decision about whether to optimize the number of bytes transferred or the number of bytes used for storage on the device.

Change Numbers

Another requirement that CAP imposes upon its clients is that each client must be able to determine all changes that have occurred to its applications' data sections since the last time those data sections were synchronized with the server. CAP uses a shorthand notation to represent the changes that can occur on client and server databases that are synchronized. This notation is the change number. Each change to a client or a server database for a specific user and data section corresponds to a change number. This includes when a record is added, modified or deleted in a database, or when an identifier mapping is performed. There are two types of change numbers.

Client Assigned Change Number (CACN): The CAP client assigns this change number every time it detects a change to the data section (record added, modified, deleted, or a server to client identifier mapping occurs). The assignment may occur concurrently with the change (e.g. the CAP client OS allows notification of changes to data sections). Alternatively, the assignment may occur during an accumulation of changes prior to synchronization (e.g. the CAP client OS is single threaded and allows the CAP client to determine changes to a data section only when the application that modifies that data section is not the active application).

Server Assigned Change Number (SACN): The server assigns this change number any time a data section is changed (record added, modified or deleted).

Change numbers for a given data section begin at one (1) and increase monotonically with each change. Note that this does not mean that change numbers are consecutive. In particular, since each client instance may not need to have reported all changes to a data section on the server (e.g. because the client instance communicated the change to the server originally, or due to filtering), server assigned change numbers may not be consecutive. Change numbers are represented as 32 bit quantities.

Returning Status for CAP Operations

A Return Status operation is typically used to inform the sender of the status of operations. But for certain data operations (see below), the Return Status operation is not required for informing the sender of a successful operation. This allows optimal use of the connection with the server without sacrificing any error reporting.

Data operations are sent to the server as part of a CAP message beginning with an Offer Client Deltas operation (see below). The server can indicate successful status for any data operation to the CAP client by indicating the last CACN it processed (see below for details on how the server communicates this information to the CAP client). If the CACN associated with the data operation is less than or equal to the last CACN the server processed, and there is no Return Status operation corresponding to the original data operation, the CAP client can assume that the original operation succeeded. The server must return a Return Status operation for any data operation that does not succeed.

Data operations are sent to a CAP client in the response message to a request message, beginning with the Get Server Changes operation (see discussion of the Get Server Deltas below). A CAP client can indicate successful status to the server for any data operation by indicating the last SACN it processed (see below for more details on how the CAP client communicates this information to the server). If the SACN associated with the data operation is less than or equal to the last SACN the CAP client processed, and there is no Return Status operation corresponding to the original data operation, the server can assume that the original operation succeeded.

A CAP client must return a Return Status operation for: (1) any data operation that does not succeed; (2) an Add operation for which the CAP client has assigned a new unique identifier to refer to the record.

Authentication

In order for a CAP client to interact with the server, it must authenticate itself to the server. During authentication, CAP clients provide an identifier and a password so that the server can authenticate the CAP client. CAP clients provide two different types of identifiers depending on how that type of client authenticates to the server for synchronization. Device clients, which manage data for a single user, authenticate to the server by specifying the user identifier as their authentication identifier. Application clients, which manage data for a large number of users, authenticate to the server by specifying the client identifier assigned to them. The process of authentication is described further below.

Synchronization Procedures

CAP supports two basic synchronization models: bi-directional and unidirectional. Bi-directional synchronization occurs when a client and server update each other with all changes since the last synchronization. Unidirectional synchronization occurs when either the client or server only receives changes from the other.

Independently from the synchronization model being used, CAP allows the client or the server to perform Conflict Analysis and Resolution (CAAR). During the synchronization procedure, CAAR is the process where changes to the same record from two different sources are reconciled.

The choice of which entity in a synchronizing relationship is the one to implement CAAR involves considerations of: (1) the relative computational power of the entities; (2) requirements for user interface if interactive conflict resolution is to be supported.

The steps followed during each of the four combinations are shown in FIGS. 1-4. Bi-directional synchronization with client CAAR is shown in FIG. 1. Bi-directional synchronization with server CAAR is shown in FIG. 2. Unidirectional synchronization with client CAAR is shown in FIG. 3. Unidirectional synchronization with server CAAR is shown in FIG. 4.

Synchronization Optimization

There are a number of synchronization optimizations that CAP clients can use to reduce the number of CAP messages necessary to complete a synchronization operation.

The first of these relates to bi-directional synchronization with Server CAAR only. The optimization is to create a message that contains the Offer Client Changes operation followed by the offered operations for the specified client database followed by the Get Server Changes operation to retrieve the synchronized server changes for the specified client database. This concatenates two requests (the Offer and the Get) into a single request message thus reducing the message traffic.

The second of these optimizations relates to all types of synchronization. The optimization is to concatenate multiple client database requests into a single message. This removes the loop to cycle through all enabled client databases, and just sends all requests for all enabled databases in a single message. Because the presence of the CAP command operation (either the Offer or the Get) in the message redefines the scope for all following operations, operations for multiple client databases can exist in a single request. Note that when a CAP client is performing bi-directional synchronization with Client CAAR, the procedure will still require two messages: one to retrieve server changes for all enabled client databases and a second to offer back the synchronized changes.

The third of these optimizations relates to all types of synchronization but only for CAP clients that synchronize data for multiple users. The optimization is to concatenate request messages like those defined in the second optimization with each request message being for a different client instance. This uses CAP to implement a "bulk synchronization" request message. Note that as in the second optimization, CAP clients implementing bi-directional synchronization with client CAAR will still need two of these messages.

Duplicate Elimination Procedure

The CAP client can also perform a procedure that allows it to eliminate duplicate copies of records on the CAP client and the server. Duplicate elimination may be used when is desired to be able to determine that a set of records is duplicated on a client instance and a server without transmitting the entire record contents. Hashes are transmitted rather than full records. Typically, the process works by having the CAP client transmit hashes for all records from a client instance data sections. Then, the server returns a list of duplicates record identifiers (or non-duplicates if the list is shorter). The client can then send only the set of records that the server does not already have.

CAP clients that have one or more of the following characteristics generally use the duplicate elimination procedure.

1. The CAP client communicates with the server through a low bandwidth network connection (e.g. a wireless network or dial-up modem connection) where there is a desire to reduce the number of bytes transmitted between the CAP client and the server.

2. The CAP client does not have a method that allows it to track CACNs on a per server basis easily (e.g. Palm OS devices that represent record changes as dirty bits).

This procedure is performed in two situations: Before the first time a CAP client synchronizes with a server. It is also performed any time the CAP client cannot guarantee that it can reproduce the next CACN that the server is likely to need to process. An example of this case would be if a Palm OS CAP client realized that it could not rely on the database "dirty" bits to indicate which records had changed in a database since the last time it synchronized with the currently selected server.

The steps in the duplicate elimination procedure are shown in FIG. 5.

Configuration Procedures

CAP clients can also communicate with the server to configure user information on the server. There are at least two operations that allow the CAP client to perform configuration operations on behalf of a user on the server.

1. Assign Device Identifier. The CAP client sends the server information about the device on which it is running and receives a Device identifier to be used in synchronization and other operations.

2. User Configuration. The CAP client sends two types of subcommands: (1) assign client instance identifier and (2) remove client instance identifier. The type of information that the client gives the server when assigning a client instance identifier includes: (1) type of client (e.g., Palm OS, Outlook 2000), (2) version of client software, (3) friendly name for the client instance, (4) optional device serial numbers (if available).

Command and Data Operations

As mentioned above, there are two types of operations: data and command. Data operations begin with operation identifier 0x00. Command operations begin with operation identifier 0x30. The data and command operations are defined in the table of FIG. 6.

The following sections provide a description of each operation including any additional data that the operation specifies. Each section also provides a definition of the operation structure using modified Backus-Naur Format (BNF). The BNF definitions use the following terms that are defined for use by any operation.

| | |
|---|---|
| unique-id = | id-length id-data |
| client-instance-id = | id-length id-data |
| db-id = | id-length id-data |
| id-length = | BYTE |
| id-data = | binary |
| octet-seq = | octet-length octet-data |
| octet-length = | WORD |
| octet-data = | binary |
| change-number = | DWORD |
| SACN = | change-number |
| CACN = | change-number |
| op-data-length = | DWORD |
| text = | <characters as defined by the HTTP 1.1 charset> |
| BYTE = | <any 8-bit value> |
| WORD = | <2-byte unsigned number in network byte order> |
| DWORD = | <4-byte unsigned number in network byte order> |

The unique-id is the unique identifier for a record. When used in an operation, the unique-id may refer to the unique identifier of the record in the database on the system from which the operation is sent or on the recipient. See the details for each operation to determine to which database the unique identifier refers.

The change-number term specifies either a client assigned or a server assigned change number (CACN or SACN). Wherever possible, operations will specify that they use either a CACN or an SACN. However, when an operation uses the change-number term, the change-number should be interpreted as being a CACN if the operation was sent from a client and an SACN if the operation was sent from the server.

The op-data-length is the length of the associated data in an operation. It can also be used to exclude optional final terms for operations. Note that this length does not include the length of the two required elements of every operation (i.e. opcode and op-data-length).

The client-instance-id is the identifier assigned by the Configure/Assign Client Instance Identifier operation.

The db-id specifies the data section to which all operations that follow in the same CAP message are to be applied.

The octet-seq specifies a sequence of bytes where the length of the sequence of bytes is known in advance. This is the CAP transfer format for items that are represented by null terminated strings in CAP clients and the server. The reason is that octet sequences are easier to parse.

Return Status Operation

The Return Status operation is used to inform the recipient about the status of a previous operation. The Return Status operation is defined below using BNF.

| | |
|---|---|
| rs-operation = | rs-command op-data-length status-header |
| rs-command = | BYTE (0x00) |
| status-header = | operation-status operation-id [operation-data] |
| operation-status = | BYTE (see below) |
| operation-id = | BYTE |
| operation-data = | (see below) |

The operation-status term gives the overall status for the original operation for which this Return Status operation is returning status. The table of FIG. 7 shows the supported values for the operation-status term.

The operation-id term is the opcode of the original operation for which this Return Status operation is returning status. The table of FIG. 8 shows the method for interpreting the operation-id and corresponding operation-data term.

The operation data for an Add operation is the original-unique-id (unique-id format) for the added record followed by the optional newly assigned-unique-id (unique-id format) for the added record. The assigned-unique-id term is the unique identifier for the record that the responder will recognize for the record from now on. There are three cases in which a responder does not have to include the optional assigned-unique-id term.

1. A responder may want to indicate that an error occurred on the Add operation that resulted in a failure to assign a Unique ID.

2. A responder may choose to accept the unique-id provided in the Add operation as the "external" unique-id for this record (i.e. the responder chooses to do local unique identifier mapping as defined in the CAP Unique Identifiers section above).

3. The server will not include the optional unique-id term.

Like any optional final term in a CAP operation, the assigned-unique-id can be omitted by excluding it from the operation data using the correct value for op-data-length. If the assigned-unique-id is returned, then the Return Status operation that contains the identifier assignment must be sent before any other operations (e.g. Modify or Delete) that reference the new unique identifier.

The other optional final term for the operation data for an Add operation is the CACN for the identifier assignment. Note that this term is not included unless there is an identifier assignment. Also notice that this is not required for the server since the server does not return identifier assignments. A client that supports identifier assignments must include the CACN for the identifier assignment. Like any optional final term in a CAP operation, the CACN can be omitted by excluding it from the operation data using the correct value for op-data-length.

The operation data for a Get Server Deltas Return Status operation is the last CACN processed by the server and an optional BYTE flag indicating if there are more changes to be retrieved (more-data-flag=1) or not (more-data-flag=0). Like any optional final term in a CAP operation, the more-data-flag can be omitted by excluding it from the operation data using the correct value for op-data-length. If the flag is omitted, its value is assumed to be zero (i.e. no more data to follow).

The operation data for an Offer Client Deltas Return Status operation is the last CACN processed by the server. If the server encountered errors in the processing of the offered deltas, the CACN should be the largest CACN processed by the server regardless of the status of the operation. If the optional more-status-flag is one (1), the server will return status for individual operations by using additional Return Status operations following the Offer Client Deltas Return Status operation. If this flag is zero (0), then no Return Status operations for individual operations follow. Like any optional final term in a CAP operation, the more-status-flag can be omitted by excluding it from the operation data using the correct value for op-data-length. If the flag is omitted, its value is assumed to be zero (i.e. no more status operations to follow).

The operation data for the Get Server State opcode is the last CACN the server successfully processed for the client-instance-id and db-id specified in the original Get Server State request operation.

The operation data for the Duplicate Elimination opcode can specify an optional ordered list of CAIDs. If the dup-flag is set (1), these are records that the server has determined do not need to be sent from the client because they already exist on the server. If the dup-flag is clear (0), the list represents the list of CAIDs that are not duplicated on the server and therefore must be sent to the server in the next synchronization procedure. Like any optional final term in a CAP operation, the CAID-list can be omitted by excluding it from the operation data using the correct value for op-data-length. The format of the list is described below using BNF.

| | |
|---|---|
| operation-data = | client-instance-id db-id [dup-flag CAID-list] |
| dup-flag = | BYTE |
| CAID-list = | list-length *[CAID] |
| list-length = | DWORD |
| CAID = | unique-id |

Add Operation

The Add operation is used to specify a record to be added by the operation recipient. The Add operation is defined below using BNF.

| | |
|---|---|
| add-operation = | add-command op-data-length add-header |
| add-command = | BYTE (0x01) |
| add-header = | change-number unique-id record-data |

The change-number is the change number (CACN for client senders and SACN for server sender) for the Add operation. The unique-id is the unique identifier of the record in the data section on the sender of the operation. The length of the record-data term can be determined from the op-data-length term.

Delete Operation

The Delete operation is used to specify a record to be deleted by the operation recipient. The Delete operation is defined below using BNF.

| | |
|---|---|
| del-operation = | del-command op-data-length change-number CAID |
| del-command = | BYTE (0x02) |

The change-number is the change number (CACN for client senders and SACN for server sender) for the Delete operation. The CAID term is CAID of the record regardless of whether the client or the server is sending this operation.

Delete all Operation

The Delete All operation is used to specify all records in a data section are to be deleted by the operation recipient. The Delete All operation is defined below using BNF.

| | |
|---|---|
| da-operation = | da-command op-data-length |
| da-command = | BYTE (0x03) |

This operation is only sent from the server. If the server receives this operation, it will return an error in a Return Status operation.

Modify Operation

The Modify operation is used to update the contents of a specified record on the recipient. The Modify operation is defined below using BNF.

| | |
|---|---|
| mod-operation = | mod-command op-data-length mod-header |
| mod-command = | BYTE (0x04) |
| mod-header = | change-number CAID record-data |

The change-number is the change number (CACN for client senders and SACN for server sender) for the Modify operation. The CAID term is CAID of the record regardless of whether the client or the server is sending this operation. The length of the record-data term can be determined from the op-data-length term.

Cancel Procedure Operation

The Cancel Procedure operation is used to request that the current procedure (e.g. synchronization) be terminated. The Cancel Procedure operation is defined below using BNF.

| | |
|---|---|
| cp-operation = | cp-command op-data-length |
| cp-command = | BYTE (0x08) |

Note that op-data-length for this operation is always zero. If this operation succeeds, the current procedure is considered canceled.

Advertise Properties Operation

The Advertise Properties operation is used to inform the recipient about the operational properties of a transmitter. The Advertise Properties operation is defined below using BNF

| | |
|---|---|
| ap-operation = | ap-command op-data-length num-properties *[property] |
| ap-command = | BYTE (0x0A) |
| num-properties = | BYTE |
| property = | property-id property-length property-value |
| property-id = | BYTE (see below) |
| property-length = | WORD |
| property-value = | (see below) |

The table of FIG. 9 shows the supported values for the property-id term and the method for interpreting the corresponding property-value term. Additional properties beyond those shown could be added. If a recipient does not understand any property-id value, it may be skipped in property parsing.

The Version property-id is a sequence of two bytes: the first contains the major version and the second contains the minor version of the CAP protocol supported.

The Cleanse Field Parameters property-id is used to specify input parameters to a cleansing rule on the server. Its value is defined below using BNF:

| | |
|---|---|
| cfp-property = | cf-rule-id cfp-num *[cfp-len cfp-data] |
| cf-rule-id = | BYTE |
| cfp-num = | BYTE |
| cfp-len = | WORD |
| cfp-data + | cfp-len BYTEs |

The cf-rule-id term specifies an identifier for the cleanse field rule. The cfp-num specifies the number of the input parameter to the cleanse field rule specified by the cf-rule-id term. The cfp-len term specifies the length of the cfp-data parameter that contains the value for the cleanse field parameter. The table of FIG. 10 shows the cleanse field rule identifiers and the values for the corresponding cfp-data terms.

Get Server Deltas Operation

The Get Server Deltas operation is used to request the changes to the specified database that have occurred since the last processed SACN. The Get Server Deltas operation is defined below using BNF.

| | |
|---|---|
| gsd-operation = | gsd-command op-data-length gsd_header |
| gsd-command = | BYTE (0x30) |
| gsd-header = | client-instance-id db-id SACN |

The Get Server Deltas operation is an initial operation in a CAP message. The client-instance-id, and db-id are specified in this operation for all other operations that follow in the same CAP message. The SACN specified in this operation is the last SACN processed by the specified client-instance-id and db-id.

Offer Client Deltas Operation

The Offer Client Deltas operation is used to specify the source and destination of operational changes from the client to the server that follow it in a CAP message. The Offer Client Deltas operation is defined below using BNF.

| | |
|---|---|
| ocd-operation = | ocd-command op-data-length ocd-header |
| ocd-header = | client-instance-id db-id [SACN] |
| ocd-command = | BYTE (0x31) |

The Offer Client Deltas operation is an initial operation in a CAP message. The client-instance-id, and db-id are specified in this operation for all other operations that follow in the same CAP message. Clients specify the optional SACN when doing synchronization with the server performing CAAR. The SACN specified is the last SACN that the client processed.

The response to this operation is defined in the Return Status operation section and includes the last CACN that the server was able to process. Note that a client may choose not to receive this response since this information is also returned in the response to the Get Server Deltas operation. Clients that use this approach trade off connection time against the storage requirements to track unacknowledged client changes.

Get Server State Operation

The Get Server State operation is used to determine the last CACN that the server processed for the specified db-id and client-instance-id. The Get Server State operation is defined below using BNF.

| | |
|---|---|
| gss-operation = | gss-command op-data-length client-instance-id db-id |
| gss-command = | BYTE (0x32) |

The response to this operation is defined in the Return Status operation section and is the last CACN for the specified client-instance-id and db-id. This operation is used when a client has detected a failure to complete a previous Offer Client Deltas operation and needs to know which client changes have been processed by the server.

Duplicate Elimination Operation

The Duplicate Elimination operation is used to determine which records in the specified db-id for the specified client-instance-id are duplicated on the client and the server. The Duplicate Elimination operation is defined below using BNF.

| | |
|---|---|
| de-operation = | de-command op-data-length client-instance-id db-id record- hash-list |
| de-command = | BYTE (0x33) |
| record-hash-list = | record-count *record-hash |
| record-count = | DWORD |
| record-hash = | CAID CAH |
| CAID = | unique-id |
| CAH = | WORD |

The response to this operation is defined in the Return Status operation section and is a list of CAIDs for records that are duplicated on the server. The CAH is a hash of all fields within each record. Its computation is defined below. The Duplicate Elimination operation can only be used when the CAP client uses the Positional Field Data format (see the Data Formats document).

The Duplicate Elimination operation computes one hash for each record. This hash is the hash of all fields in the record. The hash is computed using the algorithmic steps shown in FIG. 11.

These details of these steps are outlined in the subsections below. The algorithms below describe one possible set of operations that are executed to compute the hash for a field list. It is not intended as an optimal implementation for all clients. Different clients may wish to optimize these algorithms, e.g., for memory usage.

Field list creation consists of creating an ordered list of fields for which a hash will be computed for all records in the data section. This list consists of all fields that are defined for the record in the data section since it is not possible for the client to know which fields are mapped on the server. The order of the fields in the field list must be identical to the order defined for the Client-Id of which the client is a type. This definition occurs during client registration.

Once the lists of fields for which a hash is to be computed have been created, the values for the fields in the list must be normalized for each record in the data section. There are several steps that must be performed for each data field. Any time values must be placed in UTC (if the client supports UTC). The value for any field that has limits on its size must be truncated. Any unsupported subfields (e.g. a client supports the ADR fields with Street, City, State, Zip, but without P.O. Box, and Country) must be removed. Trailing whitespace is omitted. The field value must be encoded in the transfer data format. This includes character set encoding including the encoding of line termination characters.

Once the fields in the list for the record have been normalized, the hash for the fields is computed using the following algorithm:

```
WORD Record::ComputeHash( )
{
    WORD H = 0;
    Field F = FieldList.GetFirstField( );
    while (F)
    {
        H = F:ComputeHash(H);
        F = F.GetNext( );
    }
    return H;
}
```

Configure Operation

The Configure operation is used to assign or remove a client-instance-id. The Configure operation is defined below using BNF.

```
cfg-operation  =  cfg-command op-data-length cfg-subcommand
                  [subcommand-data]
cfg-command    =  BYTE (0x34)
cfg-subcommand =  BYTE (see table below for definition)
subcommand-data = (depends upon subcommand - see table below for
                  definition)
```

The table of FIG. 12 describes the available configuration subcommands. The Assign Client Instance ID subcommand is defined below using BNF:

```
aci-subcommand  =  aci-opcode client-id client-name
                   sw-version [device-serial-# user-id]
aci-opcode      =  BYTE (0x00)
client-id       =  id-length id-data
client-name     =  octet-seq
sw-version      =  ver-major ver-minor ver-revision
ver-major       =  WORD
ver-minor       =  WORD
ver-revision    =  WORD
device-serial-# =  octet-seq
user-id         =  octet-seq
```

The Assign Client Instance ID subcommand is used to create an association on the server between the current user login and a specific client instance. The subcommand accomplishes this association by assigning a client-instance-id to the client. The client-instance-id is an important parameter in many CAP operations and is used to identify a particular client instance for a user. The first parameter for this subcommand is the client-id. This is used to identify the type of the client (e.g. a specific Internet Application, a PalmOS device). All client-id values are assigned by the service operating the server. Example Client-id values for mobile devices are in the table of FIG. 13.

If a server has already assigned a client-instance-id for the specified client-id and client-name (or optional device-serial-# or user-id), it will return that client-instance-id.

The client-name term is used to specify a "friendly name" for the client instance. The client instance identifier is going to be useless to the user, but the client-name will help re-establish a client instance's data in the event of a loss of data on the client instance (after a sync with the client instance data on the server). The sw-version term contains the client software version (major:minor:revision) on the client instance that is requesting a client instance identifier.

The optional device-serial-# and user-id terms must be used in the following way.

1. If the CAP client is a Device Client, and that CAP client device has a serial number, the device-serial-# term is used to specify the device serial number to be used for the new device client instance. The optional user-id term can be omitted by excluding it from the operation data using the correct value for op-data-length.

2. If the CAP client is a Device Client but does not have a serial number, the device-serial-# term can be omitted by excluding it from the operation data using the correct value for op-data-length.

3. If the CAP client is an Application Client, it will not have a device serial number, but it must specify a zero id-length for the device-serial-# term. The user-id term is the identifier for the user on whose behalf it is requesting the client instance identifier.

The Remove Client Instance ID subcommand is defined below using BNF:

```
rci-subcommand =  rci-opcode client-instance-id
rci-opcode     =  BYTE (0x01)
```

The Remove Client Instance ID subcommand is used to remove an association between a client instance and the server.

The operation specific data for Return Status on Configure operations is defined below using BNF:

```
rs-data         =  subcommand subcommand-data
subcommand      =  BYTE (will be one of the subcommand opcodes
                   defined above
subcommand-data =  (see table of FIG. 14)
```

The table of FIG. 14 defines the contents of the subcommand-data term for the Return Status operation for the Configure operation.

The client-instance-id term is the newly assigned client instance identifier. If the original Assign Client Instance ID subcommand specified a user-id term, the Return Status operation must specify the same user-id term. This is to allow Application Clients to correlate client instance identifiers with the original requests. Like all optional final terms, the user-id term can be omitted by omitted by excluding it from the operation data using the correct value for op-data-length.

Binding to HTTP

This section describes the binding of the CAP protocol to HTTP 1.1.

The CAP protocol uses the HTTP POST method to perform transfers of CAP requests. HTTP GET could be used, but using POST provides greater flexibility. CAP messages are contained within the HTTP Message Body. The HTTP Message Body is encoded as Quoted Printable.

CAP response messages are received in the Body of an HTTP Response. Since CAP operations contain their own status, the HTTP status only refers to the response as a whole. Since at least one CAP operation is required in a CAP response message, the No Content (204) HTTP response status must not be returned and a Message Body must be present in the response.

The CAP connection to an HTTP server should be encrypted using SSL (or TLS) for a secure connection. Since SSL/TLS encryption is not a requirement, clients can connect to the server using an unencrypted socket (through a different URI). However, if a CAP client requires an encrypted socket connection to the server, the encryption scheme used must be SSL/TLS.

The client CAP uses several HTTP authentication methods depending upon the security applied to the underlying connection to the server.

If the connection to the server is encrypted with a negotiated SSL/TLS connection, then HTTP Basic authentication must be used. In addition, the HTTP Authorization header must be included in the first CAP request the client makes to the server. The CAP client is not required to respond to an HTTP authentication challenge since both client and server have authenticated to each other in the SSL/TLS connection.

If there is no SSL/TLS encryption used on the CAP client connection to the server, then HTTP Digest authentication must be used. HTTP Digest authentication is not completely impervious to various attacks, but it does provide a stronger level of security than basic authentication since the user password is not sent in the clear.

CAP uses Basic authentication with SSL/TSL encrypted connections. Passwords are generally transmitted as a hash (SHA-1), as on some clients the user's password is stored as a hash and the client software may not have access to the clear text version of the password.

CAP uses Digest authentication on unencrypted connections. The same password encoding restrictions for Basic apply to Digest as well. This means that instead of MD5, SHA-1 is used for HTTP Digest authentication.

All CAP clients must use HTTP 1.1 persistent connections to servers. The one exception to this is when the original server contacted requests a redirect to a different server. The reason for this is that the authentication token returned by the Authentication step is only valid on the server that processed the authentication request.

EXAMPLES

This section gives some examples of how to use the CAP protocol as a CAP client to do synchronization and other procedures. There are a few notational conventions that are used in all of the examples in this section.

1. CAP messages are separated by one empty line in the table.

2. CAP messages (requests) sent from the CAP client to the server in HTTP 1.1 POST operations are in regular font.

3. CAP messages (responses) received from the server to the CAP client in an HTTP 1.1 RESPONSE Body are in italics.

Example

Bi-Directional Synchronization with Server CAAR

This section describes the CAP messages involved in a bi-directional synchronization procedure with Server CAAR for a single data section. This example can be extended to encompass more than one data section by following the instructions in the CAP Synchronization Procedures section.

The client sends an Offer Client Deltas (OCD) operation for the current data section that specifies the SACN that the server should use to determine the set of changes for which to perform CAAR. If the client has to provide the server with a category list as a cleansing rule input (e.g., Palm OS client), it sends an Advertise Properties operation with the category list. Client sends data operations with a CACN for each and waits for a server response.

The server resolves conflicts on offered data and commits the data to the client instance's storage on the server. The server sends Return Status for the OCD with the highest CACN it was able to successfully consume (process).

The client sends a Get Server Deltas (GSD) operation specifying the last SACN it consumed and waits for the server response. (Note: For first time synchronization and resynchronization, this SACN is equal to zero.) The server sends a GSD Return Status operation specifying the last CACN it consumed (might be the last Add Return Status operation). The server sends operations for all changes with a SACN higher than that specified in the client request.

Client applies server operations to its data section. If server sent out an Add operation, and the client does not perform identifier mapping, the client has two options 1. It can send another OCD operation on the current session followed by Add Return Status operations for each identifier assignment after it has processed all server operations.

2. It can wait until the next synchronization, and send those operations following the initial OCD operation and before the next set of changes to the client data section.

The steps of the example are also shown in FIG. 15, and the actual CAP messages in FIG. 16. Note that in FIG. 16, the Return Status operation for the Add in the first CAP message was to assign a CAID to the SAID for a record that was added in the previous synchronization with this data section. If this client maintained a unique identifier mapping table, the assigned-unique-id term would not have been necessary.

Also, note that in FIG. 16, the Add operation in the message beginning with the Offer Client Deltas operation contains a sparsely populated vCard record. It is not necessary to transfer the contents of empty fields in a record but if this record had contained more fields, the record-data term for the Add operation would have needed to contain them.

Also, in FIG. 16, the Return Status operation for the Offer Client Deltas operation indicates that all CACNs offered in the original Offer Client Deltas operation were consumed by the server. There is no Return Status operation for the Add operation since all operations succeeded and there was no need to assign a unique-id (the server does not return unique-id assignments).

Finally, in FIG. 16, the CACNs from the client are consecutive. The SACNs from the server are not. But both increase monotonically to allow for a single change number to acknowledge their receipt.

Example

Bi-Directional Synchronization with Client CAAR

This section describes the CAP messages involved in a bi-directional synchronization procedure with Server CAAR for a single data section. Generally, the client sends a Get Server Deltas operation that specifies the last SACN the client consumed and waits for the server response. The server sends a Get Server Deltas Return Status operation specifying the last CACN it consumed. If the server does not perform identifier mapping, it should send all unacknowledged Add Return Status operations here (before other changes since the Return Status operations will have lower SACNs than the other changes).

The server sends operations for all changes with a SACN higher than that specified in the client request. The client performs CAAR on the set of server changes and applies the results to the local data section. The clients sends an Offer Client Deltas (OCD) operation for the current data section that does not specify an SACN for server CARR. The client sends data operations with a CACN for each and waits for a server response.

The server sends an OCD Return Status operation with the highest CACN it consumed. At this point, the client could perform another GSD to retrieve any Add Return Status operations from the server. However, since some servers may perform identifier mapping, the results of this request might always be empty.

Example

Duplicate Elimination

This section describes the CAP messages involved in a Duplication Elimination procedure for two data sections. The CAP client executes the steps of FIG. 17 to complete this procedure. The actual CAP messages are shown in FIG. 18.

Note that for most duplicate elimination procedures, there would be more than three (3) records of the example.

In the example, the duplicate elimination procedure found exactly one duplicate record with CAID 0x0F00D101.

Example

Client Instance Identifier Assignment

This section describes the (simple) CAP request and response to assign a client-instance-id to a CAP client. The CAP client executes the steps of FIG. 19 to complete this procedure. The actual CAP messages are shown in FIG. 20.

Example

Recovering State from an Incomplete Synchronization

Clients and servers use the concept of last change number received/sent to enable fast synchronization. This same information can also be used to recover synchronization state after an incomplete synchronization. If the client does not receive a Return Status for a command operation from the server acknowledging the receipt of a set of CACNs (by sending an acknowledgement of the highest CACN), it sends a Get Server State operation. When the client receives the highest consumed CACN in the Get Server State Return Status operation, it need then only send those changes that the server did not receive in the incomplete synchronization. If the client lost a connection to a server in the middle of receiving server changes, it can always send a Get Server Deltas operation with the highest SACN that it did receive.

Glossary

Some of the terms used in the detailed description are defined below. This section is intended as a brief reference. Many of the terms are defined more completely above.

AAID—Application Assigned Identifier. A unique identifier assigned to a record by an application on the CAP client system (e.g. mobile device). If the CAP client does not do unique identifier mapping, this is the same as the CAID.

CAAR—Conflict analysis and resolution. The process where conflicting changes to the same record are resolved at a field level. The CAP Client or the server can perform CAAR.

CACN—Client assigned change number. A 32-bit monotonically increasing quantity associated with an individual record change to a data section on the CAP Client. Every data operation sent from the CAP Client to the server has a CACN associated with it, including Return Status operations.

CAID—Client assigned identifier. A unique identifier that is assigned by the CAP client as the unique identifier for records that are transmitted to the server in data operations. If the CAP client does not do unique identifier mapping, this is the same as the AAID.

Client Instance ID—Client Instance Identifier. An identifier assigned by the server that uniquely identifies a specific instance of a CAP client (e.g. a mobile device, a user's account at a web-based PIM). This identifier is used to specify which client instance a user is synchronizing in a CAP Synchronization procedure.

Data Section. A data section is a type of database. For example, e-mail, address book, and calendar are all data sections. Each data section has its own data format defined for it.

Data Section Identifier. An identifier for a data section. CAP command operations use his identifier to scope all data operations that follow it in a CAP message.

Duplicate Elimination. The process where the server determines from hash values computed on all records in a CAP client data section whether the records exist on the server. This process is used as a precursor to first time synchronization between a CAP client and the server.

SACN—Server assigned change number. A 32-bit monotonically increasing quantity associated with an individual record change to a data section on the server for a client instance identifier. Every data operation returned to the CAP Client from the server has a SACN associated with it, including Return Status operations.

SAID—Server assigned identifier. A unique identifier that is assigned by the server as the unique identifier for records that are returned to the CAP client in data operations.

Unique Identifier (UID). An identifier for a record in a database on which CAP synchronization procedures are performed. This identifier is guaranteed unique in a database for the life of the database. The database can be on the CAP client or the server.

Only one specific embodiment has been described in detail herein. It will be understood that a great many changes can be made from that specific embodiment without departing from the spirit and scope of the invention. Other types of client devices than the specific ones mentioned may be used. A client device could be multiple pieces of interconnected hardware (e.g., in the case of a web-based PIM client that runs on an applications server). The communication link does not necessarily have to include a wireless link. Other forms of change codes (other than the specific change number scheme described) may be used to identify changes. Other types of operations (other than the command and data operation scheme described) may be used. The single transmission in which multiple command and data operations are transmitted does not have to be the body of an HTTP request, but could be transmitted using another protocol, and the transmission need not be over the Internet. Although we have characterized PIM databases as having data sections (e.g., calendar, address, telephone, e-mail), the invention could be practiced with PIM databases that are not divided into sections (e.g., a stand-alone calendar database, a stand-alone telephone database, or a stand-alone e-mail database).

Accordingly, other embodiments are within the scope of the following claims.

The invention claimed is:

1. A method comprising:
synchronizing a client instance of a personal information management (PIM) database stored on a client device with a server instance of a PIM database stored on a server, wherein synchronizing comprises:
running client synchronization software on the client device;
running server synchronization software on the server, which is connected to the client device over a communications link;
having the client synchronization software process at least some records of the client instance of the PIM database to form hashes of the records;
transmitting the hashes from the client device to the server;
having the server synchronization software determine from the hashes whether the at least some records of the client instance are present in the server instance;
having the server transmit to the client an indication of which of the at least some records are present in the server instance; and
having the client refrain from transmitting the records for which the indication is received that the records are present in the server instance,
wherein the indication comprises concatenated operations which identify the records, the operations comprise an op code followed by an operand.

2. The method of claim 1 wherein the PIM database comprises different sections, including at least two of the following: calendar, address, and e-mail sections.

3. The method of claim 2 wherein the at least some records that are processed by the client to form hashes comprise substantially all of the records of at least one of the sections.

4. The method of claim 3 further comprising having the client send a unique record identifier along with the hash for each of the at least some records.

5. The method of claim 4 wherein the indication transmitted to the client by the server comprises a list of record identifiers indicating to the client either the records that are found on the server or the records that are missing on the server.

6. The method of claim 1, wherein forming the hashes comprises identifying one or more fields in one or more lists, each of the lists correspond to a respective one of the records and normalizing the fields in each list for each record.

7. One or more computer programs, resident on one or more computer readable media, the computer programs comprising instructions for:
synchronizing a client instance of a personal information management (PIM) database stored on a client device with a server instance of a PIM database stored on a server, wherein synchronizing comprises:
running client synchronization software on the client device;
running server synchronization software on the server, which is connected to the client device over a communications link;
having the client synchronization software process at least some records of the client instance of the PIM database to form hashes of the records;
transmitting the hashes from the client device to the server;
having the server synchronization software determine from the hashes whether the at least some records of the client instance are present in the server instance;
having the server transmit to the client an indication of which of the at least some records are present in the server instance; and
having the client refrain from transmitting the records for which the indication is received that the records are present in the server instance,
wherein the indication comprises concatenated operations which identify the records, the operations comprise an op code followed by an operand.

8. The computer programs of claim 7 wherein the PIM database comprises different sections, including at least two of the following: calendar, address, and e-mail sections.

9. The computer programs of claim 8 wherein the at least some records that are processed by the client to form hashes comprise substantially all of the records of at least one of the sections.

10. The computer programs of claim 9 further comprising having the client send a unique record identifier along with the hash for each of the at least some records.

11. The computer programs of claim 10 wherein the indication transmitted to the client by the server comprises a list of record identifiers indicating to the client either the records that are found on the server or the records that are missing on the server.

12. The computer programs of claim 7, wherein forming the hashes comprises identifying one or more fields in one or more lists, each of the lists correspond to a respective one of the records and normalizing the fields in each list for each record.

13. An apparatus comprising a processing element configured to:
process at least some records of a first instance of a personal information management (PIM) database stored on the apparatus to form hashes of the records;
transmit the hashes;
receive an indication identifying whether at least one record, among the records, are present in a second instance of the PIM database stored on a server based on evaluating the hashes to determine whether the at least one record of the first instance is present in the second instance; and
refrain from transmitting the records for which the indication is received specifying that the records are present in the second instance,
wherein the indication comprises concatenated operations which identify the records, the operations comprise an op code followed by an operand.

14. The apparatus of claim 13, wherein the processing element is further configured to form the hashes by identifying one or more fields in one or more lists, each of the lists correspond to a respective one of the records and normalizing the fields in each list for each record.

15. A method comprising:
processing at least some records of a first instance of a personal information management (PIM) database stored on an apparatus to form hashes of the records;
transmitting the hashes;
receiving an indication identifying whether at least one record, among the records, are present in a second instance of the PIM database stored on a server based on evaluating the hashes to determine whether the at least one record of the first instance is present in the second instance; and
refraining from transmitting the records for which the indication is received specifying that the records are present in the second instance, wherein the indication comprises concatenated operations which identify the records, the operations comprise an op code followed by an operand.

16. The method of claim 15, wherein forming the hashes comprises identifying one or more fields in one or more lists, each of the lists correspond to a respective one of the records and normalizing the fields in each list for each record.

17. One or more computer programs, resident on one or more computer readable media, the computer programs comprising instructions for:

processing at least some records of a first instance of a personal information management (PIM) database stored on an apparatus to form hashes of the records;

transmitting the hashes;

receiving an indication identifying whether at least one record, among the records, are present in a second instance of the PIM database stored on a server based on evaluating the hashes to determine whether the at least one record of the first instance is present in the second instance; and refraining from transmitting the records for which the indication is received specifying that the records are present in the second instance, wherein the indication comprises concatenated operations which identify the records, the operations comprise an op code followed by an operand.

18. The computer programs of claim 17, wherein forming the hashes comprises identifying one or more fields in one or more lists, each of the lists correspond to a respective one of the records and normalizing the fields in each list for each record.

* * * * *